(12) United States Patent
Asami

(10) Patent No.: US 9,470,873 B2
(45) Date of Patent: Oct. 18, 2016

(54) IMAGING LENS AND IMAGING APPARATUS

(71) Applicant: FUJIFILM CORPORATION, Tokyo (JP)

(72) Inventor: Taro Asami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 72 days.

(21) Appl. No.: 14/569,865

(22) Filed: Dec. 15, 2014

(65) Prior Publication Data
US 2015/0168698 A1    Jun. 18, 2015

(30) Foreign Application Priority Data

Dec. 18, 2013   (JP) .................................. 2013-260969

(51) Int. Cl.
*G02B 9/06*      (2006.01)
*G02B 15/16*     (2006.01)
*G02B 9/64*      (2006.01)

(52) U.S. Cl.
CPC ............... *G02B 9/06* (2013.01); *G02B 15/161* (2013.01); *G02B 9/64* (2013.01)

(58) Field of Classification Search
CPC ........... G02B 9/60; G02B 9/08; G02B 9/12; G02B 9/34; G02B 9/62; G02B 9/64
USPC ....... 359/754, 755, 759, 760, 767–769, 779, 359/780, 791, 792, 794
See application file for complete search history.

(56) References Cited

U.S. PATENT DOCUMENTS

| | | | | |
|---|---|---|---|---|
| 5,920,433 A | * | 7/1999 | Sugawara | G02B 13/22 359/649 |
| 6,697,202 B2 | * | 2/2004 | Mori | G02B 13/04 359/749 |
| 7,948,691 B2 | * | 5/2011 | Okumura | G02B 27/0025 359/745 |
| 2013/0242175 A1 | * | 9/2013 | Kuzuhara | G02B 27/646 348/360 |
| 2014/0334020 A1 | * | 11/2014 | Ono | G02B 9/12 359/740 |

FOREIGN PATENT DOCUMENTS

| | | |
|---|---|---|
| JP | 5-224119 | 9/1993 |
| JP | 2001-330771 | 11/2001 |

OTHER PUBLICATIONS

DE Search Report dated Jul. 29, 2015, with English Translation; Application No. 10 2014 118 648.6.

* cited by examiner

*Primary Examiner* — Darryl J Collins
(74) *Attorney, Agent, or Firm* — Young & Thompson

(57) ABSTRACT

The imaging lens substantially consists of a first lens group having a positive refractive power and a second lens group having a positive refractive power, in which the entire second lens group moves along the optical axis to perform focusing. In the imaging lens, the first lens group comprises a positive first lens, a negative second lens, a negative third lens, a positive fourth lens, and a positive fifth lens in this order from the object side. When the Abbe number of the second lens with respect to the d-line is $vd2$ and the Abbe number of the third lens with respect to the d-line is $vd3$, conditional formula (1) below is satisfied:

$$2.0 < vd2/vd3 \qquad (1).$$

10 Claims, 13 Drawing Sheets

EXAMPLE 1

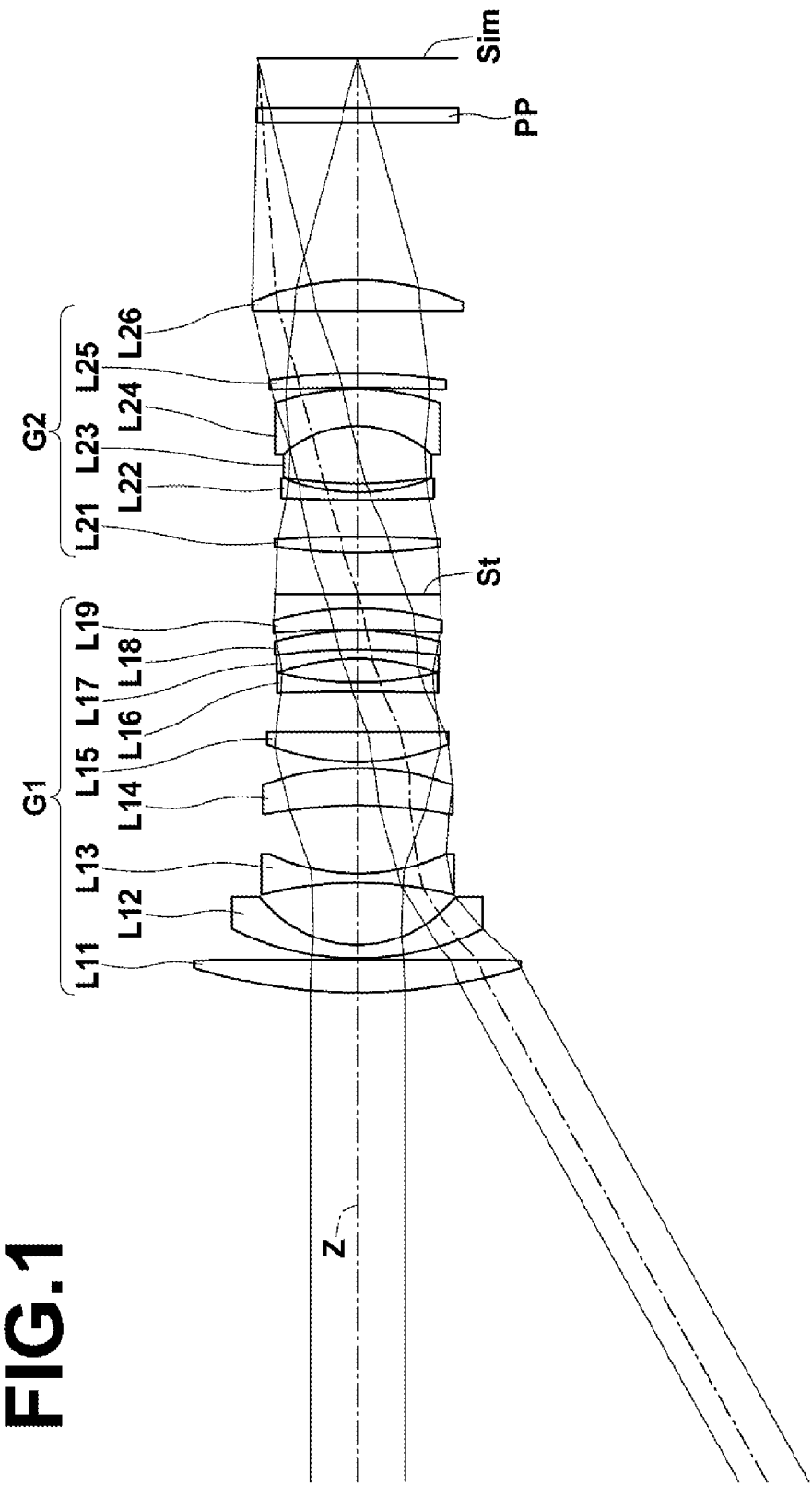

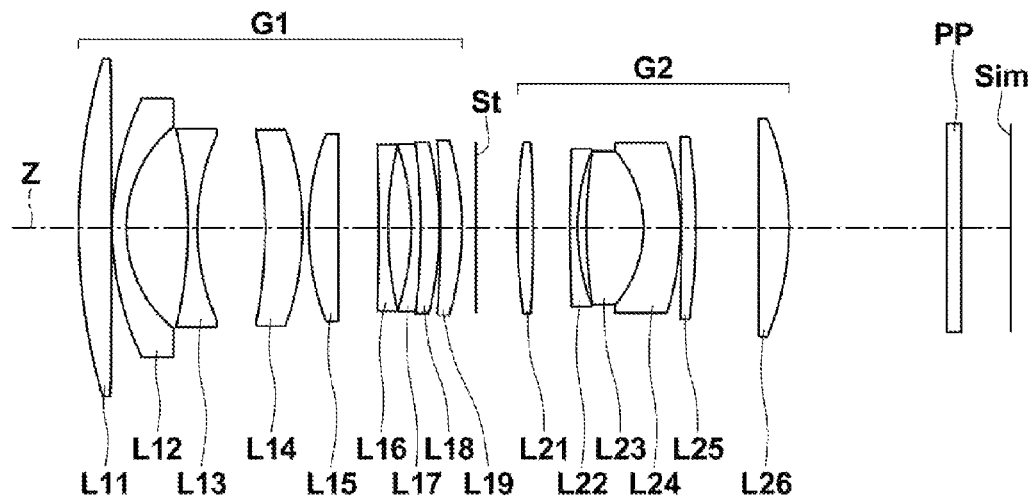
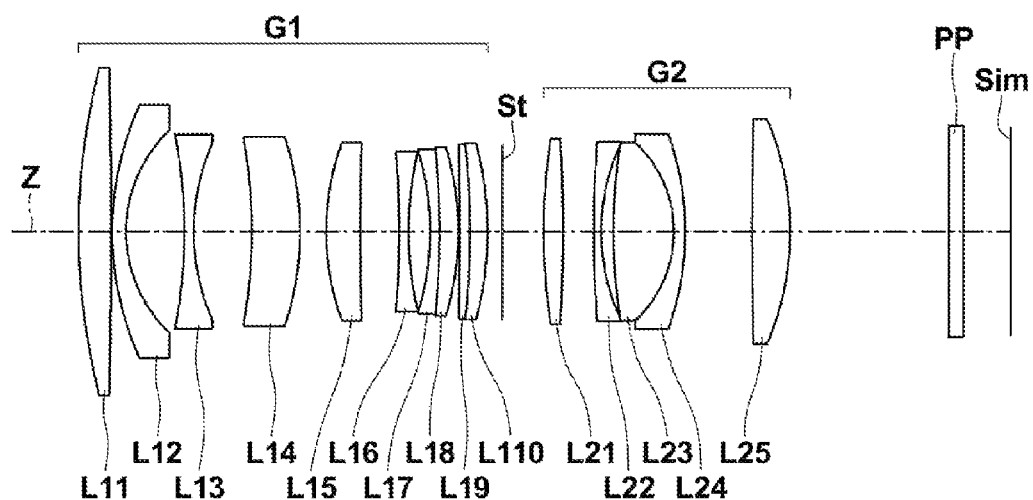

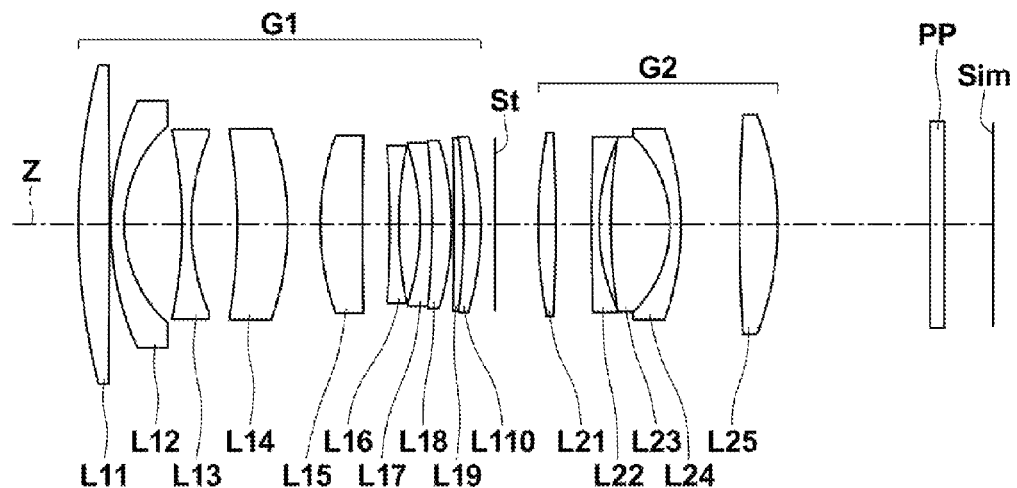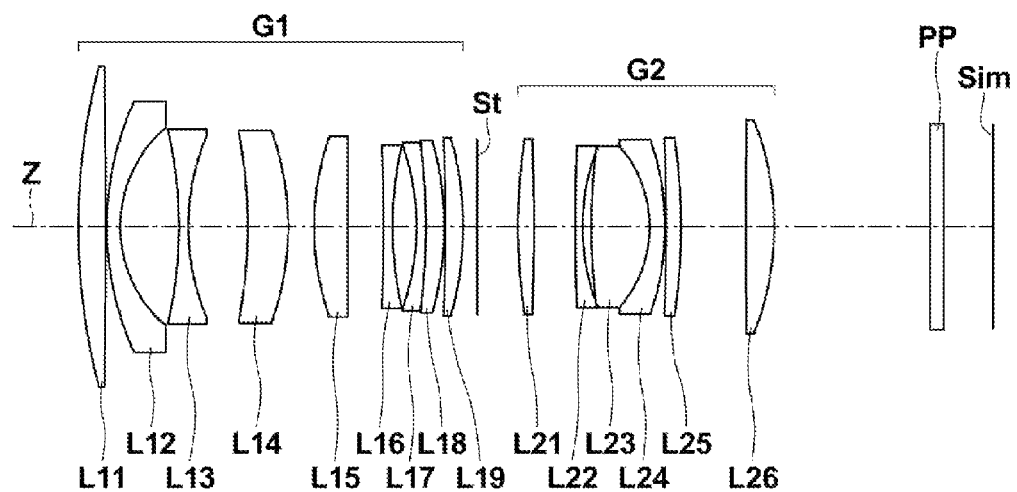

FIG.11

EXAMPLE 3

DISTANCE: INFINITY

EXAMPLE 5

IMAGING LENS AND IMAGING APPARATUS

CROSS-REFERENCE TO RELATED APPLICATIONS

The present application claims priority under 35 U.S.C. §119 to Japanese Patent Application No. 2013-260969, filed on Dec. 18, 2011 The above application is hereby expressly incorporated by reference, in its entirety, into the present application.

BACKGROUND OF THE INVENTION

1. Technical Field

The present invention relates to an imaging lens, and more particularly to an imaging lens that is favorably used for an electronic camera such as a digital camera, a broadcasting camera, a surveillance camera, a movie camera, and the like.

Further, the present invention relates to an imaging apparatus as described above.

2. Description of the Related Art

Conventionally, imaging apparatuses such as video cameras, electronic still cameras, and the like that utilize image sensors such as a CCD (Charge Coupled Device) and a CMOS (Complementary Metal Oxide Semiconductor) as a recording medium are widely put to practical uses. Further, imaging lenses disclosed in Patent Documents 1 and 2 (Japanese Unexamined Patent Publication No. 2001-330771 and Japanese Unexamined Patent Publication No. 5 (1993)-224119) are known as imaging lenses which are favorably applied for use in such imaging apparatuses.

The imaging lens disclosed in Patent Document 1 consists of a first lens group having a positive refractive power, an aperture stop, and a second lens group having a positive refractive power in this order from the object side, wherein the first lens group includes of five lenses in which a positive lens, a negative lens, a negative lens, a positive lens, and a positive lens are disposed in this order from the object side.

Further, the imaging lens disclosed in Patent Document 2 consists of a first lens group which is consistuted by three positive meniscus lenses, a second lens group which is constituted by a negative meniscus lens, an aperture stop, a third lens group having a positive refractive power, and a fourth lens group having a positive refractive power in this order from the object side.

SUMMARY OF THE INVENTION

The imaging lens disclosed in Patent Document 1 is deemed to have a problem such that correcting chromatic aberrations favorably is difficult.

The imaging lens disclosed in Patent Document 2 is also deemed to have a problem such that widening the angle of view is difficult because three lenses which are the first lens through the third lens are all positive lenses.

The present invention has been developed in view of the above circumstances. It is an object of the present invention to provide an imaging lens which is capable of correcting chromatic aberrations satisfactorily and in which an angle of view can be easily widened as well as an imaging apparatus.

A first imaging lens according to the present invention substantially consists of a first lens group having a positive refractive power and a second lens group having a positive refractive power in this order from the object side, wherein focusing is performed by moving the entirety of the second lens group along the optical axis;

the first lens group comprises a first lens having a positive refractive power which is disposed on the most-object side, a second lens having a negative refractive power which is disposed next to the first lens on the image side, a third lens having a negative refractive power which is disposed next to the second lens on the image side, a fourth lens having a positive refractive power which is disposed next to the third lens on the image side, and a fifth lens having a positive refractive power which is disposed next to the fourth lens on the image side; and the imaging lens satisfies conditional formula (1):

$$2.0 < vd2/vd3 \tag{1},$$

where vd2: the Abbe number of the second lens with respect to the d-line, and vd3: the Abbe number of the third lens with respect to the d-line.

Here, the above expression "substantially consisting of" intends to mean that lenses substantially without any refractive power; optical elements other than lenses such as stops, cover glasses, filters and the like; lens flanges; lens barrels; image sensors; and mechanical parts such as image stabilization mechanisms, and the like; in addition to the first lens group and the second lens group listed above. Further, the above expression "the second lens having a negative refractive power which is disposed next to the first lens on the image side" intends to mean that the first lens and the second lens are arranged in such a positional relationship without disposing other lenses therebetween. The same applies to the lenses which follow after the second lens. Further, regarding the powers of the lenses below, "having a positive refractive power" will simply be described as "positive" and "having a negative refractive power" will simply be described as "negative", unless particularly necessary.

Note that it is desirable for the lower limit of the condition (that is, the equation; the same applies hereinafter), the numerical range of which is defined by conditional formula (1), to be 2.5, and more preferably 3.0. Further, it is preferable for the upper limit of this condition to be 5.0. That is, it is desirable for this condition to satisfy the conditional formulas below:

$$2.5 < vd2/vd3 \tag{1-1}$$

$$3.0 < vd2/vd3 \tag{1-2}$$

$$2.0 < vd2/vd3 < 5.0 \tag{1-3}.$$

Further, it is more preferable for the upper limit of the value of vd2/vd3 to be 4.0.

A second imaging lens of the present invention substantially consists of a first lens group having a positive refractive power and a second lens group having a positive refractive power in this order from the object side, wherein focusing is performed by moving the entirety of the second lens group along the optical axis; and the most-image-side lens of the first lens group, a lens which is second from the most-image side in the first lens group, and a lens which is third from the most-image side in the first lens group are all meniscus lenses with convex surfaces toward the image side.

The imaging lens of the present invention can take a preferred embodiment in which this second imaging lens and the first imaging lens are combined together.

Note that in the second imaging lens described above, it is desirable for the most-image-side lens of the first lens group to be a positive lens, for a lens which is second from the most-image side in the first lens group to be a positive lens, and for a lens which is third from the most-image side in the first lens group to be a negative lens.

Further, it is desirable for the first imaging lens and the second imaging lens according to the present invention (hereinafter, when referring to both of these imaging lenses, the phrase "imaging lens according to the present invention" or "imaging lens of the present invention" will be employed) to include an aperture stop between the first lens group and the second lens group.

In the imaging lens of the present invention, it is desirable for the first lens group to include the positive first lens which is disposed on the most-object side, the negative second lens which is disposed next to the first lens on the image side, the negative third lens which is disposed next to the second lens on the image side, the positive fourth lens which is disposed next to the third lens on the image side, the positive fifth lens which is disposed next to the fourth lens on the image side, a negative sixth lens which is disposed next to the fifth lens on the image side, a negative seventh lens which is disposed next to the sixth lens on the image side, a positive eighth lens which is disposed next to the seventh lens on the image side, and a positive ninth lens which is disposed next to the eighth lens on the image side.

It is desirable for the imaging lens of the present invention to satisfy conditional formula (2) below:

$$1.0 < FA/FB < 8.0 \qquad (2),$$

where
FA: the focal length of the first lens group, and
FB: the focal length of the second lens group.

Note that with respect to the condition, the numerical range of which is defined by conditional formula (2), it is more preferable for conditional formula (2-1) below to be satisfied, even more preferable for conditional formula (2-2) below to be satisfied, and still more preferable for conditional formula (2-3) below to be satisfied:

$$1.5 < FA/FB < 7.0 \qquad (2-1)$$

$$2.0 < FA/FB < 6.0 \qquad (2-2)$$

$$2.2 < FA/FB < 5.0 \qquad (2-3).$$

It is desirable for the imaging lens of the present invention in which the first lens group includes the first lens disposed on the most-object side to satisfy conditional formula (3) below:

$$1 < f1/f < 6 \qquad (3),$$

where
f1: the focal length of the first lens, and
f: the focal length of the entire system.

Note that with respect to the condition, the numerical range of which is defined by conditional formula (3), it is more preferable for conditional formula (3-1) below to be satisfied, even more preferable for conditional formula (3-2) below to be satisfied, and still more preferable for conditional formula (3-3) below to be satisfied:

$$2 < f1/f < 5.5 \qquad (3-1)$$

$$2.5 < f1/f < 4.5 \qquad (3-2)$$

$$3 < f1/f < 5 \qquad (3-3).$$

In the imaging lens of the present invention, it is desirable for the most-image-side lens of the second lens group to be a positive lens and for conditional formula (4) below to be satisfied:

$$0.5 < (RLF+RLB)/(RLF-RLB) < 3.0 \qquad (4),$$

where
RLF: the radius of curvature of the object-side surface of the most-image-side lens of the second lens group, and
RLB: the radius of curvature of the image-side surface of the most-image-side lens of the second lens group.

Note that with respect to the condition, the numerical range of which is defined by conditional formula (4), it is more preferable for conditional formula (4-1) below to be satisfied, even more preferable for conditional formula (4-2) below to be satisfied, and still more preferable for conditional formula (4-3) below to be satisfied:

$$0.5 < (RLF+RLB)/(RLF-RLB) < 2.5 \qquad (4-1)$$

$$0.55 < (RLF+RLB)/(RLF-RLB) < 2.0 \qquad (4-2)$$

$$0.6 < (RLF+RLB)/(RLF-RLB) < 1.5 \qquad (4-3).$$

In the imaging lens of the present invention, it is desirable for a lens which is second from the most-image side in the second lens group to be a positive lens and for conditional formula (5) below to be satisfied:

$$0.3 < (RL2F+RL2B)/(RL2F-RL2B) < 3.0 \qquad (5),$$

where
RL2F: the radius of curvature of the object-side surface of the lens which is second from the most-image side in the second lens group, and
RL2B: the radius of curvature of the image-side surface of the lens which is second from the most-image side in the second lens group.

Note that with respect to the condition, the numerical range of which is defined by conditional formula (5), it is more preferable for conditional formula (5-1) below to be satisfied, even more preferable for conditional formula (5-2) below to be satisfied, and still more preferable for conditional formula (5-3) below to be satisfied:

$$0.8 < (RL2F+RL2B)/(RL2F-RL2B) < 2.5 \qquad (5-1)$$

$$1.2 < (RL2F+RL2B)/(RL2F-RL2B) < 2.0 \qquad (5-2)$$

$$1.4 < (RL2F+RL2B)/(RL2F-RL2B) < 1.8 \qquad (5-3).$$

In the imaging lens of the present invention, it is desirable for both the most-image-side lens and the lens which is second from the most-image side in the second lens group to be lenses with convex surfaces toward the image side.

In the imaging lens of the present invention, it is desirable for the most-image-side lens in the first lens group to be a positive meniscus lens with a convex surface toward the image side.

In the imaging lens of the present invention, it is desirable for the first lens group to include the first lens which is disposed on the most-object side, the second lens which is disposed next to the first lens on the image side, the third lens which is disposed next to the second lens on the image side, and the fourth lens which is disposed next to the third lens on the image side; and for conditional formula (6) below to be satisfied:

$$-3.0 < f1234/f < -0.5 \qquad (6),$$

where
f1234: the combined focal length of the first lens through the fourth lens, and
f: the focal length of the entire system.

Note that with respect to the condition, the numerical range of which is defined by conditional formula (6), it is more preferable for conditional formula (6-1) below to be satisfied, even more preferable for conditional formula (6-2) below to be satisfied, and still more preferable for conditional formula (6-3) below to be satisfied:

$$-2.5<f1234/f<-0.7 \qquad (6\text{-}1)$$

$$-2.0<f1234/f<-0.9 \qquad (6\text{-}2)$$

$$-1.9<f1234/f<-1.2 \qquad (6\text{-}3).$$

In the imaging lens of the present invention, it is desirable for the first lens group to include the first lens which is disposed on the most-object side, the second lens which is disposed next to the first lens on the image side, and the third lens which is disposed next to the second lens on the image side; and for conditional formula (7) below to be satisfied:

$$-3.0<f123/f<-0.2 \qquad (7),$$

where
f123: the combined focal length of the first lens through the third lens, and
f: the focal length of the entire system.

Note that with respect to the condition, the numerical range of which is defined by conditional formula (7), it is more preferable for conditional formula (7-1) below to be satisfied, even more preferable for conditional formula (7-2) below to be satisfied, and still more preferable for conditional formula (7-3) below to be satisfied:

$$-2.5<f123/R-0.4 \qquad (7\text{-}1)$$

$$-2.0<f123/R-0.5 \qquad (7\text{-}2)$$

$$-1.5<f123/R-0.7 \qquad (7\text{-}3).$$

In the imaging lens of the present invention, it is desirable for the most-object-side lens of the first lens group to be a biconvex lens.

In the imaging lens of the present invention, it is desirable for the first lens group to include the first lens which is disposed on the most-object side, the second lens which is disposed next to the first lens on the image side, the third lens which is disposed next to the second lens on the image side, the fourth lens which is disposed next to the third lens on the image side, and the fifth lens which is disposed next to the fourth lens on the image side; and for both the Abbe number vd4 of the fourth lens with respect to the d-line and the Abbe number vd5 of the fifth lens with respect to the d-line to be less than or equal to 45.

It is desirable for the imaging lens of the present invention to satisfy conditional formula (8) below:

$$2<FA/f<12.0 \qquad (8),$$

where
FA: the focal length of the first lens group, and
f: the focal length of the entire system.

Note that with respect to the condition, the numerical range of which is defined by conditional formula (8), it is more preferable for conditional formula (8-1) below to be satisfied, even more preferable for conditional formula (8-2) below to be satisfied, and still more preferable for conditional formula (8-3) below to be satisfied:

$$3<FA/f<10.0 \qquad (8\text{-}1)$$

$$4<FA/f<9.0 \qquad (8\text{-}2)$$

$$5<FA/f<8.0 \qquad (8\text{-}3).$$

It is desirable for the imaging lens of the present invention to satisfy conditional formula (9) below:

$$0.5<FB/f<3.0 \qquad (9),$$

where
FB: the focal length of the second lens group, and
f: the focal length of the entire system.

Note that with respect to the condition, the numerical range of which is defined by conditional formula (9), it is more preferable for conditional formula (9-1) below to be satisfied, even more preferable for conditional formula (9-2) below to be satisfied, and still more preferable for conditional formula (9-3) below to be satisfied:

$$0.8<FB/f<2.8 \qquad (9\text{-}1)$$

$$1.0<FB/f<2.3 \qquad (9\text{-}2)$$

$$1.4<FB/f<2.1 \qquad (9\text{-}3).$$

In the imaging lens of the present invention, it is desirable for the first lens group to include the first lens which is disposed on the most-object side, the second lens which is disposed next to the first lens on the image side, the third lens which is disposed next to the second lens on the image side, and the fourth lens which is disposed next to the third lens on the image side; and for conditional formula (10) below to be satisfied:

$$1.5<(R7+R8)/(R7-R8)<5.0 \qquad (10),$$

where
R7: the radius of curvature of the object-side surface of the fourth lens, and
R8: the radius of curvature of the image-side surface of the fourth lens.

Note that with respect to the condition, the numerical range of which is defined by conditional formula (10), it is more preferable for conditional formula (10-1) below to be satisfied, even more preferable for conditional formula (10-2) below to be satisfied, and still more preferable for conditional formula (10-3) below to be satisfied:

$$2.0<(R7+R8)/(R7-R8)<4.8 \qquad (10\text{-}1)$$

$$2.6<(R7+R8)/(R7-R8)<4.5 \qquad (10\text{-}2)$$

$$2.8<(R7+R8)/(R7-R8)<4.0 \qquad (10\text{-}3).$$

In the imaging lens of the present invention, it is desirable for the first lens group to include the first lens which is disposed on the most-object side, the second lens which is disposed next to the first lens on the image side, the third lens which is disposed next to the second lens on the image side, and the fourth lens which is disposed next to the third lens on the image side; and for conditional formula (11) below to be satisfied:

$$0.1<D6/f<1.5 \qquad (11),$$

where
D6: the distance between the third lens and the fourth lens, and
f: the focal length of the entire system.

Here, the above expression "the distance between the third lens and the fourth lens" refers to the distance between the image-side surface of the third lens and the object-side surface of the fourth lens.

Note that with respect to the condition, the numerical range of which is defined by conditional formula (11), it is more preferable for conditional formula (11-1) below to be satisfied, even more preferable for conditional formula (11-

2) below to be satisfied, and still more preferable for conditional formula (11-3) below to be satisfied:

$$0.15<D6/f<1.3 \quad (11\text{-}1)$$

$$0.2<D6/f<1.0 \quad (11\text{-}2)$$

$$0.22<D6/f<0.8 \quad (11\text{-}3).$$

In the imaging lens of the present invention, it is desirable for the first lens group to include the first lens which is disposed on the most-object side, the second lens which is disposed next to the first lens on the image side, and the third lens which is disposed next to the second lens on the image side; and for conditional formula (12) below to be satisfied:

$$0.1<D4/f<1.5 \quad (12),$$

where
D4: the distance between the second lens and the third lens, and
f: the focal length of the entire system.

Here, the above expression "the distance between the second lens and the third lens" refers to the distance between the image-side surface of the second lens and the object-side surface of the third lens.

Note that with respect to the condition, the numerical range of which is defined by conditional formula (12), it is more preferable for conditional formula (12-1) below to be satisfied, even more preferable for conditional formula (12-2) below to be satisfied, and still more preferable for conditional formula (12-3) below to be satisfied:

$$0.15<D4/f<1.2 \quad (12\text{-}1)$$

$$0.2<D4/f<1.0 \quad (12\text{-}2)$$

$$0.21<D4/f<0.7 \quad (12\text{-}3).$$

In the imaging lens of the present invention, it is desirable for the first lens group to include the first lens disposed on the most-object side and the second lens disposed next to the first lens on the image side; and for conditional formula (13) below to be satisfied:

$$-3.0<f1/f2<-0.05 \quad (13),$$

where
f1: the focal length of the first lens, and
f2: the focal length of the second lens.

Note that with respect to the condition, the numerical range of which is defined by conditional formula (13), it is more preferable for conditional formula (13-1) below to be satisfied, even more preferable for conditional formula (13-2) below to be satisfied, and still more preferable for conditional formula (13-3) below to be satisfied:

$$-1.8<f1/f2<-0.2 \quad (13\text{-}1)$$

$$-1.5<f1/f2<-0.25 \quad (13\text{-}2)$$

$$-1.0<f1/f2<-0.25 \quad (13\text{-}3).$$

In the imaging lens of the present invention, it is desirable for the first lens group to include the first lens which is disposed on the most-object side; and for conditional formula (14) to be satisfied:

$$2.0<L/f<8.0 \quad (14),$$

where
L: the distance from the object-side surface of the first lens to the imaging plane (back focus corresponds to an air converted length), and
f: the focal length of the entire system.

Note that with respect to the condition, the numerical range of which is defined by conditional formula (14), it is more preferable for conditional formula (14-1) below to be satisfied, even more preferable for conditional formula (14-2) below to be satisfied, and still more preferable for conditional formula (14-3) below to be satisfied:

$$2.5<L/f<7.5 \quad (14\text{-}1)$$

$$3.0<L/f<7.0 \quad (14\text{-}2)$$

$$3.5<L/f<6.0 \quad (14\text{-}3).$$

It is desirable for the imaging lens of the present invention to satisfy conditional formula (15) below:

$$0.3<Bf/f<3.0 \quad (15),$$

where
Bf: back focus (air converted length), and
f: the focal length of the entire system.

Note that with respect to the condition, the numerical range of which is defined by conditional formula (15), it is more preferable for conditional formula (15-1) below to be satisfied, even more preferable for conditional formula (15-2) below to be satisfied, and still more preferable for conditional formula (15-3) below to be satisfied:

$$0.5<Bf/f<2.5 \quad (15\text{-}1)$$

$$0.8<Bf/f<2.0 \quad (15\text{-}2)$$

$$1.0<Bf/f<1.8 \quad (15\text{-}3).$$

In the imaging lens of the present invention, it is desirable for the first lens group to include the first lens which is disposed on the most-object side and the second lens which is disposed next to the first lens on the image side; and for conditional formula (16) below to be satisfied:

$$-5.0<(R1+R2)/(R1-R2)<-0.2 \quad (16),$$

where
R1: the radius of curvature of the object-side surface of the first lens, and
R2: the radius of curvature of the image-side surface of the second lens.

Note that with respect to the condition, the numerical range of which is defined by conditional formula (16), it is more preferable for conditional formula (16-1) below to be satisfied, even more preferable for conditional formula (16-2) below to be satisfied, and still more preferable for conditional formula (16-3) below to be satisfied:

$$-4.0<(R1+R2)/(R1-R2)<-0.3 \quad (16\text{-}1)$$

$$-3.0<(R1+R2)/(R1-R2)<-0.4 \quad (16\text{-}2)$$

$$-2.0<(R1+R2)/(R1-R2)<-0.6 \quad (16\text{-}3).$$

In the imaging lens of the present invention, it is desirable for the first lens group to include the first lens which is disposed on the most-object side, the second lens which is disposed next to the first lens on the image side, the third lens which is disposed next to the second lens on the image side, the fourth lens which is disposed next to the third lens on the image side, and the fifth lens which is disposed next to the fourth lens on the image side; and for conditional formula (17) below to be satisfied:

$$-5.0<(R9+R10)/(R9-R10)<-0.2 \quad (17),$$

where
R9: the radius of curvature of the object-side surface of the fifth lens, and R10: the radius of curvature of the image-side surface of the fifth lens.

Note that with respect to the condition, the numerical range of which is defined by conditional formula (17), it is more preferable for conditional formula (17-1) below to be satisfied, even more preferable for conditional formula (17-2) below to be satisfied, and still more preferable for conditional formula (17-3) below to be satisfied:

$$-4.0<(R9+R10)/(R9-R10)<-0.3 \tag{17-1}$$

$$-3.0<(R9+R10)/(R9-R10)<-0.4 \tag{17-2}$$

$$-2.0<(R9+R10)/(R9-R10)<-0.5 \tag{17-3}.$$

Here, a preferred shape of each of the lenses which constitute the imaging lens of the present invention and the detailed configurations related thereto will be described. Note that the first lens through the ninth lens to be described later refer to lenses which are disposed in the order of the first, the second, the third . . . the ninth lens from the object side without disposing other lenses between the respective adjacent lenses as described above. The refractive power of each of the first lens through the ninth lens is not limited to the refractive power mentioned above. That is, the first lens through the ninth lens mentioned here define only the order in which the lenses are disposed.

It is desirable for the first lens group to include at least one cemented lens, particularly a cemented lens formed by cementing at least one positive lens and a negative lens together.

It is desirable for each of the first, the second, and the third lens from the most-image side in the first lens group to be a meniscus lens.

Further, it is desirable for each of the first, the second, and the third lens from the most-image side in the first lens group to be a lens with a convex surface toward the image side.

It is desirable for the most-image-side lens of the first lens group to be a positive meniscus lens.

It is desirable for the first lens to be a biconvex lens.

It is desirable for the absolute value of the radius of curvature of the object-side surface of the first lens to be smaller than the absolute value of the radius of curvature of the image-side surface of the first lens.

It is desirable for the second lens to be a concave meniscus lens with a convex surface toward the object side.

It is desirable for the third lens to be a biconcave lens.

It is desirable for the absolute value of the radius of curvature of the object-side surface of the third lens to be greater than the absolute value of the radius of curvature of the image-side surface of the third lens.

It is desirable for the fourth lens to be a positive lens.

It is desirable for the fourth lens to be a meniscus lens with a convex surface toward the image side.

It is desirable for the fifth lens to be a positive lens.

It is desirable for the fifth lens to be a lens with a convex surface toward the object side.

It is desirable for the fifth lens to a positive meniscus lens with a convex surface toward the object side or a planoconvex lens.

It is desirable for the sixth lens to be a negative lens.

Further, it is desirable for the sixth lens to be a biconcave lens.

It is desirable for the absolute value of the radius of curvature of the object-side surface of the sixth lens to be greater than the absolute value of the radius of curvature of the image-side surface of the sixth lens.

It is desirable for the seventh lens to be a meniscus lens with a concave surface toward the object side.

It is desirable for the seventh lens to be a negative lens.

It is desirable for the eighth lens to be a meniscus lens with a concave surface toward the object side.

It is desirable for the eighth lens to be a positive lens.

It is desirable for the seventh lens and the eighth lens to be cemented to each other.

It is desirable for the ninth lens to be a meniscus lens with a concave surface toward the object side.

It is desirable for the ninth lens to be a positive lens.

It is desirable for the second lens group to include at least one cemented lens.

Further, it is desirable for the second lens group to include a cemented lens formed by cementing at least one positive lens and a negative lens together.

Further, it is desirable for the second lens group to include at least two or more negative lenses.

It is desirable for the most-object-side lens of the second lens group to be a positive lens.

It is desirable for the most-object-side lens of the second lens group to be a biconvex lens.

It is desirable for the most-object-side lens of the second lens group to have the absolute value of the radius of curvature of the object-side surface which is smaller than the absolute value of the radius of curvature of the image-side surface.

It is desirable for the lens which is second from the object side in the second lens group to be a negative lens.

It is desirable for the lens which is third from the object side in the second lens group to be a positive lens.

It is desirable for the lens which is fourth from the object side in the second lens group to be a negative lens.

Further, it is desirable for the lens which is third from the object side in the second lens group and the lens which is fourth from the object side in the second lens group to be cemented to each other.

It is desirable for the lens which is fifth from the object side in the second lens group to be a positive lens.

It is desirable for the lens which is sixth from the object side in the second lens group to be a positive lens.

It is desirable for the most-image-side lens of the second lens group to be a positive lens.

The lens which is second from the most-image side in the second lens group may be a positive lens.

It is desirable for each of the most-image-side lens of the second lens group and the lens which is second from the most-image side in the second lens group to be a lens with a convex surface toward the image side.

It is desirable for all of the object-side surface of the most-object-side lens in the first lens group, the image-side surface of the most-image-side lens in the first lens group, the object-side surface of the most-object-side lens in the second lens group, and the image-side surface of the most-image-side lens in the second lens group to be convex surfaces.

Next, the Abbe number, the partial dispersion ratio, and the refractive index suitable for each of the lenses which constitute the imaging lens of the present invention will be described. Note that the Abbe numbers and the refractive indices defined in the imaging lens of the present invention are all with respect to the d-line, and the partial dispersion ratios are all with respect to the g-line and the F-line. The description thereof will be omitted below, unless particularly necessary. Further, the first lens through the eighth lens to be described below refer to lenses which are disposed in the order of the first, the second, the third the eighth lens from the object side without disposing other lenses between the respective adjacent lenses as described above. In addition, the refractive power of each of the first lens through the eighth lens is not limited to the refractive power mentioned above. That is, the first lens through the eighth lens mentioned here define only the order in which the lenses are disposed.

First, it is desirable for the Abbe number of the first lens to be greater than or equal to 30, and more preferably greater than or equal to 35.

It is desirable for the Abbe number of the second lens to be greater than or equal to 50, more preferably greater than or equal to 55, even more preferably greater than or equal to 60, and still more preferably greater than or equal to 65.

It is desirable for the Abbe number of the third lens to be less than or equal to 30, more preferably less than or equal to 28, and even more preferably less than or equal to 27.

It is desirable for the Abbe number of the third lens to be greater than or equal to 20.

Further, regarding the third lens, the Abbe number is preferably between 15 and 30, and the partial dispersion ratio is preferably greater than or equal to 0.6 and more preferably greater than or equal to 0.61.

It is desirable for the Abbe number of the fourth lens to be less than or equal to 40, and more preferably less than or equal to 35.

Further, regarding the fourth lens, the Abbe number is preferably between 22 and 40, and the partial dispersion ratio is preferably greater than or equal to 0.58.

It is desirable for the Abbe number of the fifth lens to be less than or equal to 40, and more preferably less than or equal to 35.

Further, regarding the fifth lens, the Abbe number is preferably between 22 and 40, and the partial dispersion ratio is preferably greater than or equal to 0.58.

It is desirable for the Abbe number of the sixth lens to be greater than or equal to 25, and more preferably greater than or equal to 30.

It is desirable for the Abbe number of the sixth lens to be less than or equal to 55, and more preferably less than or equal to 50.

It is desirable for the Abbe number of the seventh lens to be greater than or equal to 15, more preferably greater than or equal to 18, and even more preferably greater than or equal to 20.

It is desirable for the Abbe number of the seventh lens to be less than or equal to 33, more preferably less than or equal to 30, and even more preferably less than or equal to 28.

It is desirable for the Abbe number of the eighth lens to be greater than or equal to 50, more preferably greater than or equal to 55, even more preferably greater than or equal to 60, and still more preferably greater than or equal to 70.

It is desirable for the Abbe number of the most-image-side lens of the first lens group to be less than or equal to 40, more preferably less than or equal to 30, and even more preferably less than or equal to 28.

It is desirable for the Abbe number of the lens which is second from the most-image side in the first lens group to be greater than or equal to 50, more preferably greater than or equal to 55, even more preferably greater than or equal to 60, and still more preferably greater than or equal to 65.

It is desirable for the Abbe number of the lens which is third from the most-image side in the first lens group to be less than or equal to 30, more preferably less than or equal to 28, and even more preferably less than or equal to 26.

It is desirable for the Abbe number of the most-object-side lens of the second lens group to be greater than or equal to 30, more preferably greater than or equal to 35, and even more preferably greater than or equal to 38.

It is desirable for the Abbe number of the lens which is second from the most-object side in the second lens group to be greater than or equal to 20, and more preferably greater than or equal to 30.

It is desirable for the Abbe number of the lens which is third from the most-object side in the second lens group to be greater than or equal to 40, more preferably greater than or equal to 50, and even more preferably greater than or equal to 60.

It is desirable for the Abbe number of the lens which is fourth from the most-object side in the second lens group to be less than or equal to 30, more preferably less than or equal to 29, and even more preferably less than or equal to 28.

It is desirable for the Abbe number of the most-image-side lens of the second lens group to be greater than or equal to 40, more preferably greater than or equal to 45, and even more preferably greater than or equal to 50.

It is desirable for the Abbe number of the lens which is second from the most-image side in the second lens group to be greater than or equal to 40, more preferably greater than or equal to 45, and even more preferably greater than or equal to 48.

In the case that a cemeted lens is employed for the second lens group, it is desirable for the Abbe number of the positive lens which constitutes the cemented lens to be greater than or equal to 40, more preferably greater than or equal to 50, and even more preferably greater than or equal to 60.

In the case that a cemeted lens is employed for the second lens group, it is desirable for the Abbe number of the negative lens which constitutes the cemented lens to be less than or equal to 30, more preferably less than or equal to 29, and even more preferably less than or equal to 28.

It is desirable for the refractive index of the first lens to be greater than 1.7, and more preferably greater than 1.75.

It is desirable for the refractive index of the first lens to be less than 1.9.

An imaging apparatus according to the present invention is provided with the imaging lens according to the present invention described above.

The first imaging lens according to the present invention substantially consists of:

a first lens group having a positive refractive power and a second lens group having a positive refractive power in this order from the object side, wherein focusing is performed by moving the entirety of the second lens group along the optical axis;

the first lens group comprises a positive first lens which is disposed on the most-object side, a negative second lens which is disposed next to the first lens on the image side, a negative third lens which is disposed next to the second lens on the image side, a positive fourth lens which is disposed next to the third lens on the image side, and a positive fifth lens which is disposed next to the fourth lens on the image side; and conditional formula (1) below is satisfied when the Abbe numbers of the second lens and the third lens with respect to the d-line are respectively vd2 and vd3:

$$2.0 < vd2/vd3 \qquad (1).$$

Thereby, the advantageous effects below will be exhibited.

First, disposing a positive lens on the most-object side facilitates correction of distortion.

Configuring the second lens and the third lens to be negative lenses facilitates widening the angle of view of the lens system.

Configuring the fourth lens and the fifth lens to be positive lenses facilitates correction of spherical aberration.

Configuring the value of νd2/νd3 to exceed the lower limit defined by conditional formula (1) facilitates increasing the Abbe number of the second lens, thereby enabling longitudinal chromatic aberration to be easily corrected, or facilitates reducing the Abbe number of the third lens to increase the partial dispersion ratio of the third lens, thereby enabling lateral chromatic aberration to be easily corrected.

The second imaging lens of the present invention substantially consists of:

a positive first lens group and a positive second lens group in this order from the object side;

focusing is performed by moving the entirety of the second lens group along the optical axis; and the most-image-side lens of the first lens group, a lens which is second from the most-image side in the first lens group, and a lens which is third from the most-image side in the first lens group are all meniscus lenses with convex surfaces toward the image side. This facilitates favorable correction of spherical aberration.

The imaging apparatus of the present invention equipped with the first imaging lens according to the present invention facilitates correcting distortion, widening the angle of view of the lens system, and correcting spherical aberration; and enables longitudinal chromatic aberration or lateral chromatic aberration to be easily corrected in the same manner as described above. These points enable excellent images to be obtained.

The imaging apparatus of the present invention equipped with the second imaging lens according to the present invention facilitates correcting spherical aberration favorably in the same manner as described above. This enables excellent images to be obtained.

BRIEF DESCRIPTION OF THE DRAWINGS

FIG. 1 is a cross-sectional view illustrating the lens configuration of an imaging lens according to one embodiment of the present invention.

FIG. 2 is a cross-sectional view illustrating the lens configuration of an imaging lens of Example 1 of the present invention.

FIG. 3 is a cross-sectional view illustrating the lens configuration of an imaging lens of Example 2 of the present invention.

FIG. 4 is a cross-sectional view illustrating the lens configuration of an imaging lens of Example 3 of the present invention.

FIG. 5 is a cross-sectional view illustrating the lens configuration of an imaging lens of Example 4 of the present invention.

FIG. 11 illustrates aberration diagrams of the imaging lens of Example 3 described above.

DESCRIPTION OF THE PREFERRED EMBODIMENTS

Figure 6:
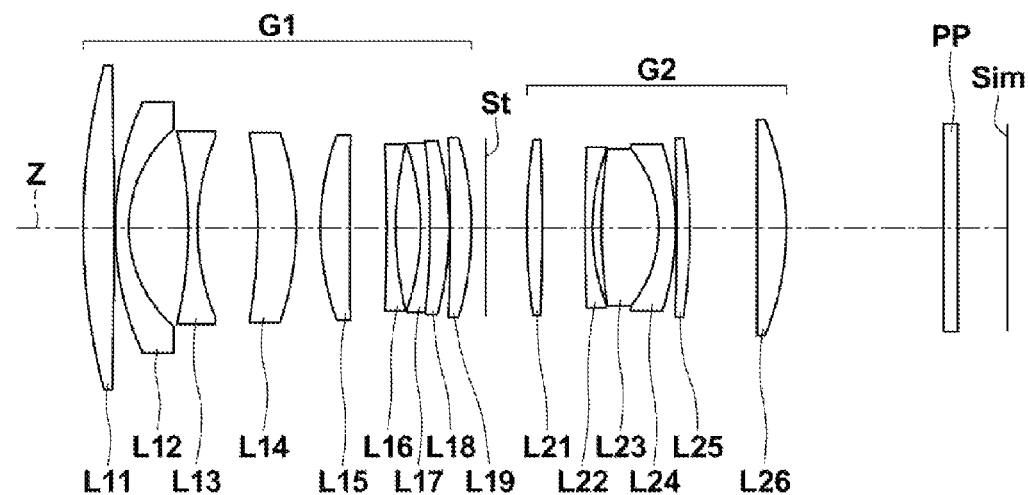
FIG. 6 is a cross-sectional view illustrating the lens configuration of an imaging lens of Example 5 of the present invention.

Hereinafter, embodiments of the present invention will be described in detail with reference to the accompanying drawings. FIG. 1 is a cross-sectional view illustrating the lens configuration of an imaging lens according to one embodiment of the present invention with optical paths. The example shown in FIG. 1 corresponds to Example 1 to be described later. In FIG. 1, the left side is the object side, and the right side is the image side. Further, the state focused on the object at infinity is shown.

When this imaging lens is applied to an imaging apparatus, it is preferable for a cover glass, various types of filters, such as an infrared cut filter, a low-pass filter, and the like to be provided between the optical system and the imaging plane Sim according to the configurations of a camera on which the lens is mounted. FIG. 1 illustrates an example in which a plane parallel optical member PP that presumes such filters and a cover glass is provided between the lens system and an imaging plane Sim. However, the optical member PP is not a constituent element necessary for the imaging lens of the present invention.

The imaging lens of the present embodiment consists of a first lens group G1 having a positive refractive power and a second lens group G2 having a positive refractive power in this order from the object side along the optical axis Z. Focusing is performed by moving the entirety of the second lens group G2 along the optical axis Z.

The first lens group G1 consists of a positive first lens L11, a negative second lens L12, a negative third lens L13, a positive fourth lens L14, a positive fifth lens L15, a negative sixth lens L16, a negative seventh lens L17, a positive eighth lens L18, and a positive ninth lens L19 in this order from the object side along the optical axis Z. Note that the seventh lens L17 and the eighth lens L18 are cemented to each other.

The second lens group G2 consists of a positive lens L21, a negative lens L22, a positive lens L23, a negative lens L24, a positive lens L25, and a positive lens L26 in this order from the object side along the optical axis Z. Note that the positive lens L23 and the negative lens L24 are cemented to each other.

An aperture stop St is disposed between the first lens group G1 and the second lens group G2. In this case, the aperture stop St shown in FIG. 1 does not necessarily represent the size or shape thereof, but the position thereof on the optical axis Z. Disposing the aperture stop St between the first lens group G1 and the second lens group G2 in such a manner facilitates suppression of the diameters of the lenses so that miniaturization of the lens system will be facilitated.

In the present embodiment, both the first lens group G1 and the second lens group G2 which are respectively disposed at the front and the back of the sperture stop St have positive refractive powers. Thereby, cancelling out aberrations which occur at the front and the back of the aperture stop St will be facilitated, and therefore correcting spherical aberration, astigmatism, and comatic aberration will be facilitated.

In the present embodiment, when the Abbe numbers of the above second lens L12 and the third lens L13 with respect to the-d line are respectively vd2 and vd3, conditional formula (1) below is satisfied:

$$2.0<vd2/vd3 \qquad (1).$$

Note that Table 15 to be described later collectively shows values of the conditions, numerical ranges of which are respectively defined by this conditional formula (1) and the other conditional formulas (2) through (17) for each Example. As shown in Table 15, in the present embodiment corresponding to Example 1, the value of vd2/vd3 is specifically 3.43.

In the present embodiment, disposing the first lens L11 which is a positive lens on the most-object side facilitates correction of distortion. Further, configuring the second lens L12 and the third lens L13 to be negative lenses facilitates widening the angle of view of the lens system. Configuring the fourth lens L14 and the fifth lens L15 to be positive lenses facilitates correction of spherical aberration.

Configuring the value of vd2/vd3 to exceed the lower limit of conditional formula (1) facilitates increasing the Abbe number of the second lens L12. This enables longitudinal chromatic aberration to be easily corrected. Alternatively, configuring the value of vd2/vd3 to exceed the lower limit of conditional formula (1) facilitates recuding the Abbe number of the third lens L13 and increasing the partial dispersion ratio of the third lens L13. This enables longitudinal chromatic aberration and lateral chromatic aberration to be easily corrected.

In order to further enhance the above advantageous effect obtained by satisfying conditional formula (1), it is preferable for the lower limit of the condition defined by conditional formula (1) to be 2.5, and more preferably 3.5. That is, it is more preferable for conditional formula (1-1) below to be satisfied, and even mover preferable for conditional formula (1-2) below to be satisfied:

$$2.5<vd2/vd3 \qquad (1-1)$$

$$3.0<vd2/vd3 \qquad (1-2).$$

Further, regarding the value of vd2/vd3 described above, it is also preferable for conditional formula (1-3) below to be satisfied:

$$2.0<vd2/vd3<5.0 \qquad (1-3).$$

Configuring the upper limit of the value of vd2/vd3 to 5.0 in such a manner facilitates suppression of the cost for the lens material. Further, it is preferable for the upper limit of the value of vd2/vd3 to be 4.0. In this case, the above advantageous effect will become more prominent.

In the present embodiment, configuring all of the ninth lens L19 which is the most-image-side lens of the first lens group G1, the eighth lens L18 which is the lens that is second from the most-image side in the first lens group G1, and the seventh lens L17 which is the lens that is third from the most-image side in the first lens group G1 to be meniscus lenses with convex surfaces toward the image side facilitates favorable correction of spherical aberration.

In the present embodiment, configuring all of the ninth lens L19 which is the most-image-side lens of the first lens group G1, the eighth lens L18 which is the lens that is second from the most-image side in the first lens group G1, and the seventh lens L17 which is the lens that is third from the most-image side in the first lens group G1 to be negative lenses facilitates favorable correction of spherical aberration.

In the present embodiment, the positive first lens L11 is disposed on the most-object side, and two or more negative lenses (particularly, the second lens L12 and the third lens L13) are disposed adjacent thereto. This facilitates correction of distortion while having a wide angle of view and securing long back focus.

Further, disposing the positive fourth lens L14 and the positive fifth lens L15 as the fourth lens and the fifth lens, respectively facilitates correction of field curvature and spherical aberration. Further, disposing the negative sixth lens L16, the negative seventh lens L17, the positive eighth lens L18, and the positive ninth lens L19 as the sixth lens through the ninth lens, respectively facilitates favorable correction of spherical aberration and field curvature as well as longitudinal chromatic aberration and lateral chromatic aberration.

In the present embodiment, when the focal length of the first lens group G1 is FA and the focal length of the second lens group G2 is FB, conditional formula (2) below is satisfied:

$$1.0<FA/FB<8.0 \qquad (2).$$

Particularly, the value of FA/FB is 4.46 in Example 1 as shown in Table 15.

Configuring the value of FA/FB to be less than the upper limit defined by conditional formula (2) facilitates suppressing an excessive decrease in the power of the first lens group G1. This facilitates a reduction of the diameter. Alternatively, configuring the value of FA/FB to be less than the upper limit defined by conditional formula (2) facilitates suppressing an excessive increase in the power of the second lens group G2. This facilitates securing back focus. In contrast, configuring the value of FA/FB to be greater than the lower limit defined by conditional formula (2) facilitates suppressing an excessive increase in the positive power of the first lens group G1. This makes it easy to widen the angle of view. Alternatively, configuring the value of FA/FB to be greater than the lower limit defined by conditional formula (2) facilitates suppressing an excessive decrease in the power of the second lens group G2. This makes it easy to suppress the angles at which the peripheral rays enter the image sensor.

Note that in order to further enhance the above advantageous effect obtained by satisfying conditional formula (2), it is preferable for the upper limit of the condition defined by conditional formula (2) to be 7.0, more preferably 6.0, and even more preferably 5.0. Further, in order to further enhance the above advantageous effect, it is preferable for the lower limit of the condition defined by conditional formula (2) to be 1.5, more preferably 2.0, and even more preferably 2.2. That is, the advantageous effect will be enhanced further by satisfying conditional formulas (2-1), (2-2), or (2-3), for example:

$$1.5<FA/FB<7.0 \qquad (2-1)$$

$$2.0<FA/FB<6.0 \qquad (2-2)$$

$$2.2<FA/FB<5.0 \qquad (2-3).$$

In the present embodiment, the first lens group G1 includes the first lens L11 which is disposed on the most-object side. When the focal length of the first lens L11 is f1 and the focal length of the entire system is f, conditional formula (3) below is satisfied:

$$1 < f1/f < 6 \quad (3).$$

Particularly, the value of f1/f is 3.63 in Example 1 as shown in Table 15.

Configuring the value of f1/f to be less than the upper limit defined by conditional formula (3) facilitates correction of distortion. In contrast, configuring the value of f1/f to be greater than the lower limit defined by conditional formula (3) facilitates widening the angle of view. Note that the power of the first lens L11 is not limited to the power in the present embodiment to obtain the above advantageous effect.

In order to further enhance the above advantageous effect obtained by satisfying conditional formula (3), it is preferable for the upper limit of the condition defined by conditional formula (3) to be 5.5, more preferably 5.0, and even more preferably 4.5. Further, in order to enhance the above advantageous effect further, it is preferable for the lower limit of the condition defined by conditional formula (3) to be 2, more preferably 2.5, and even more preferably 3. That is, the above advantageous effect will be enhanced further by satisfying conditional formulas (3-1), (3-2), or (3-3), for example:

$$2 < f1/f < 5.5 \quad (3\text{-}1)$$

$$2.5 < f1/f < 4.5 \quad (3\text{-}2)$$

$$3 < f1/f < 5 \quad (3\text{-}3).$$

In the present embodiment, the most-image-side lens of the second lens group G2 is a positive lens L26. When the radius of curvature of the object-side surface of the positive lens L26 which is disposed on the most-image side and the radius of curvature of the image-side surface of the positive lens L26 are respectively RLF and RLB, conditional formula (4) below is satisfied:

$$0.5 < (RLF+RLB)/(RLF-RLB) < 3.0 \quad (4).$$

Particularly, the value of (RLF+RLB)/(RLF−RLB) is 1.00 in Example 1 as shown in Table 15.

Configuring the value of (RLF+RLB)/(RLF−RLB) to be less than the upper limit defined by conditional formula (4) facilitates preventing the radii of curvature of both surfaces of the positive lens L26 (front and back lens surfaces) from excessively approximating each other. This makes it easy to prevent the power of the positive lens L26 from becoming weak. As the result thereof, suppressing the angles at which the peripheral rays enter the image sensor will be facilitated. In contrast, configuring the value of (RLF+RLB)/(RLF−RLB) to be greater than the lower limit defined by conditional formula (4) facilitates increasing the difference between the radii of curvature of both surfaces of the positive lens L26. As the result thereof, correcting astigmatism and comatic aberration will be facilitated.

Note that in order to further enhance the above advantageous effect obtained by satisfying conditional formula (4), it is preferable for the upper limit of the condition defined by conditional formula (4) to be 2.5, more preferably 2.0, and even more preferably 1.5. Further, in order to enhance the above advantageous effect further, it is more preferable for the lower limit of the condition defined by conditional formula (4) to be 0.55, and even more preferably 0.6. That is, the above advantageous effect will be enhanced further by satisfying conditional formulas (4-1), (4-2), or (4-3), for example:

$$0.5 < (RLF+RLB)/(RLF-RLB) < 2.5 \quad (4\text{-}1)$$

$$0.55 < (RLF+RLB)/(RLF-RLB) < 2.0 \quad (4\text{-}2)$$

$$0.6 < (RLF+RLB)/(RLF-RLB) < 1.5 \quad (4\text{-}3).$$

In the present embodiment, the lens which is second from the most-image side in the second lens group G2 is the positive lens L25. When the radius of curvature of the object-side surface of the positive lens L25 which is second from the most-image side and the radius of curvature of the image-side surface of the positive lens L25 are respectively RL2F and RL2B; conditional formula (5) below is satisfied:

$$0.3 < (RL2F+RL2B)/(RL2F-RL2B) < 3.0 \quad (5).$$

Particularly, the value of (RL2F+RL2B)/(RL2F−RL2B) is 1.67 in Example 1 as shown in Table 15.

Configuring the value of (RL2F+RL2B)/(RL2F−RL2B) to be less than the upper limit defined by conditional formula (5) facilitates preventing the radii of curvature of both surfaces of the positive lens L25 (front and back lens surfaces) from excessively approximating each other. This makes it easy to prevent the power of the positive lens L25 from becoming weak. As the result thereof, suppressing the angles at which the peripheral rays enter the image sensor will be facilitated. In contrast, configuring the value of (RL2F+RL2B)/(RL2F−RL2B) to be greater than the lower limit defined by conditional formula (5) facilitates increasing the difference between the radii of curvature of both surfaces of the positive lens L25. As the result thereof, correcting astigmatism and comatic aberration will be facilitated.

Note that in order to further enhance the above advantageous effect obtained by satisfying conditional formula (5), it is preferable for the upper limit of the condition defined by conditional formula (5) to be 2.5, more preferably 2.0, and even more preferably 1.8. Further, in order to enhance the above advantageous effect further, it is more preferable for the lower limit of the condition defined by conditional formula (5) to be 0.8, even more preferably 1.2, and still more preferably 1.4. That is, the above advantageous effect will be enhanced further by satisfying conditional formulas (5-1), (5-2), or (5-3), for example:

$$0.8 < (RL2F+RL2B)/(RL2F-RL2B) < 2.5 \quad (5\text{-}1)$$

$$1.2 < (RL2F+RL2B)/(RL2F-RL2B) < 2.0 \quad (5\text{-}2)$$

$$1.4 < (RL2F+RL2B)/(RL2F-RL2B) < 1.8 \quad (5\text{-}3).$$

In the present embodiment, both the positive lens L26 which is the most-image-side lens of the second lens group G2 and the positive lens L25 which is the lens that is second from the most-image side are lenses with convex surfaces toward the image. This facilitates correction of astigmatism and comatic aberration.

In the present embodiment, the first lens group G1 includes the first lens L11, the second lens L12, the third lens L13, and the fourth lens L14 in this order from the object side. When the combined focal length of the first lens L11 through the fourth lens L14 is f1234 and the focal length of the entire system is f, conditional formula (6) below is satisfied:

$$-3.0 < f1234/f < -0.5 \quad (6).$$

Particularly, the value of fl234/f is −1.42 in Example 1 as shown in Table 15.

Configuring the value of f1234/f to be less than the upper limit defined by conditional formula (6) facilitates suppressing an excessive decrease of the combined focal length of the first lens L11 through the fourth lens L14 as a negative value. This facilitates correction of astigmatism. In contrast, configuring the value of f1234/f to be greater than the lower limit defined by conditional formula (6) facilitates suppressing an excessive increase of the combined focal length of the first lens L11 through the fourth lens L14 as a negative value. This facilitates widening the angle of view. Note that the lens power arrangement of the first lens L11 through the fourth lens L14 is not limited to the power arrangement in the present embodiment to obtain the advantageous effect described above.

In order to further enhance the above advantageous effect obtained by satisfying conditional formula (6), it is preferable for the upper limit of the condition defined by conditional formula (6) to be −0.7, more preferably −0.9, and even more preferably −1.2. Further, in order to enhance the above advantageous effect further, it is more preferable for the lower limit of the condition defined by conditional formula (6) to be −2.5, even more preferably −2.0, and still more preferably −1.9. That is, the above advantageous effect will be enhanced further by satisfying conditional formulas (6-1), (6-2), or (6-3), for example:

$$-2.5 < f1234/f < -0.7 \quad (6\text{-}1)$$

$$-2.0 < f1234/f < -0.9 \quad (6\text{-}2)$$

$$-1.9 < f1234/f < -1.2 \quad (6\text{-}3).$$

In the present embodiment, the first lens group G1 includes the first lens L11, the second lens L12, and the third lens L13. When the combined focal length of the first lens L11 through the third lens L13 is f123 and the focal length of the entire system is f, conditional formula (7) below is satisfied:

$$-3.0 < f123/f < -0.2 \quad (7).$$

Particularly, the value of f123/f is −0.85 in Example 1 as shown in Table 15.

Configuring the value of f123/f to be less than the upper limit defined by conditional formula (7) facilitates suppressing an excessive decrease of the combined focal length of the first lens L11 through the third lens L13 as a negative value. This facilitates correction of field curvature. In contrast, configuring the value of f123/f to be greater than the lower limit defined by conditional formula (7) facilitates suppressing an excessive increase of the combined focal length of the first lens L11 through the third lens L13 as a negative value. This facilitates widening the angle of view. Note that the lens power arrangement of the first lens L11 through the third lens L13 is not limited to the power arrangement in the present embodiment to obtain the advantageous effect described above.

In order to further enhance the above advantageous effect obtained by satisfying conditional formula (7), it is preferable for the upper limit of the condition defined by conditional formula (7) to be −0.4, more preferably −0.6, and even more preferably −0.7. Further, in order to enhance the above advantageous effect further, it is more preferable for the lower limit of the condition defined by conditional formula (7) to be −2.5, even more preferably −2.0, and still more preferably −1.5. That is, the above advantageous effect will be enhanced further by satisfying conditional formulas (7-1), (7-2), or (7-3), for example:

$$-2.5 < f123/f < -0.4 \quad (7\text{-}1)$$

$$-2.0 < f123/f < -0.5 \quad (7\text{-}2)$$

$$-1.5 < f123/f < -0.7 \quad (7\text{-}3).$$

In the present embodiment, the first lens L11 which is the most-object-side lens of the first lens group G1 is a biconvex lens. This facilitates correction of distortion.

In the present embodiment, the first lens group G1 includes the first lens L11, the second lens L12, the third lens L13, the fourth lens L14, and the fifth lens L15 in this order from the object side, and both of the Abbe numbers vd4 and vd5 of the fourth lens L14 and the fifth lens L15 with respect to the d-line are less than or equal to 45. Particularly, both of the values of the Abbe numbers vd4 and vd5 are 31.32 in Example 1 as shown in Table 1 to be described later. Configuring both of the Abbe numbers vd4 and vd5 to be less than or equal to 45 in such a manner facilitates correction of lateral chromatic aberration. Note that the lens power arrangement of the first lens L11 through the fifth lens L15 is not limited to the power arrangement in the present embodiment to obtain the advantageous effect described above.

In the present embodiment, when the focal length of the first lens group G1 is FA and the focal length of the entire system is f, conditional formula (8) below is satisfied:

$$2 < FA/f < 12.0 \quad (8).$$

Particularly, the value of FA/f is 7.69 in Example 1 as shown in Table 15.

Configuring the value of FA/f to be less than the upper limit defined by conditional formula (8) facilitates suppressing an excessive decrease in the power of the first lens group G1. This makes it easy to miniaturize the system. In contrast, configuring the value of FAN to be greater than the lower limit defined by conditional formula (8) facilitates suppressing an excessive increase in the power of the first lens group G1. As the result thereof, widening the angle of view will be facilitated or correcting field curvature will be facilitated.

In order to further enhance the above advantageous effect obtained by satisfying conditional formula (8), it is preferable for the upper limit of the condition defined by conditional formula (8) to be 10.0, more preferably 9.0, and even more preferably 8.0. Further, in order to enhance the above advantageous effect obtained by satisfying conditional formula (8) further, it is more preferable for the lower limit of the condition defined by conditional formula (8) to be 3.0, even more preferably 4.0, and still more preferably 5.0. That is, the above advantageous effect will be enhanced further by satisfying conditional formulas (8-1), (8-2), or (8-3), for example:

$$3 < FA/f < 10.0 \quad (8\text{-}1)$$

$$4 < FA/f < 9.0 \quad (8\text{-}2)$$

$$5 < FA/f < 8.0 \quad (8\text{-}3).$$

In the present embodiment, when the focal length of the second lens group G2 is FB and the focal length of the entire system is f, conditional formula (9) below is satisfied:

$$0.5 < FB/f < 3.0 \quad (9).$$

Particularly, the value of FB/f is 1.73 in Example 1 as shown in Table 15.

Configuring the value of FB/f to be less than the upper limit defined by conditional formula (9) facilitates suppressing an excessive decrease in the power of the second lens group G2. This facilitates suppressing the angles at which the peripheral rays enter the image sensor. In contrast, configuring the value of FB/f to be greater than the lower limit defined by conditional formula (9) facilitates suppressing an excessive increase in the power of the second lens group G2. This facilitates making the back focus long and correcting field curvature.

In order to further enhance the above advantageous effect obtained by satisfying conditional formula (9), it is preferable for the upper limit of the condition defined by conditional formula (9) to be 2.8, more preferably 2.3, and even more preferably 2.1. Further, in order to enhance the above advantageous effect further, it is more preferable for the lower limit of the condition defined by conditional formula (9) to be 0.8, even more preferably 1.0, and still more preferably 1.4. That is, the above advantageous effect will be enhanced further by satisfying conditional formulas (9-1), (9-2), or (9-3), for example:

$$0.8 < FB/f < 2.8 \tag{9-1}$$

$$1.0 < FB/f < 2.3 \tag{9-2}$$

$$1.4 < FB/f < 2.1 \tag{9-3}$$

In the present embodiment, the first lens group G1 includes the first lens L11, the second lens L12, the third lens L13, and the fourth lens L14 in this order from the object side. When the radius of curvature of the object-side surface of the fourth lens L14 and the radius of curvature of the image-side surface of the fourth lens L14 are respectively R7 and R8, conditional formula (10) below is satisfied:

$$1.5 < (R7+R8)/(R7-R8) < 5.0 \tag{10}$$

Particularly, the value of (R7+R8)/(R7−R8) is 3.78 in Example 1 as shown in Table 15.

Configuring the value of (R7+R8)/(R7−R8) to be less than the upper limit defined by conditional formula (10) facilitates preventing the radii of curvature of the front and back surfaces of the fourth lens L14 from excessively approximating each other. This makes it easy to correct spherical aberration. In contrast, configuring the value of (R7+R8)/(R7−R8) to be greater than the lower limit defined by conditional formula (10) facilitates increasing the difference between the radii of curvature of the front and back surfaces of the fourth lens L14. This makes it easy to correct astigmatism. Note that the lens power arrangement of the first lens L11 through the fourth lens L14 is not limited to the power arrangement in the present embodiment to obtain the advantageous effect described above.

In order to further enhance the above advantageous effect obtained by satisfying conditional formula (10), it is preferable for the upper limit of the condition defined by conditional formula (10) to be 4.8, more preferably 4.5, and even more preferably 4.0. Further, in order to enhance the above advantageous effect further, it is more preferable for the lower limit of the condition defined by conditional formula (10) to be 2.0, even more preferably 2.6, and still more preferably 2.8. That is, the above advantageous effect will be enhanced further by satisfying conditional formulas (10-1), (10-2), or (10-3), for example:

$$2.0 < (R7+R8)/(R7-R8) < 4.8 \tag{10-1}$$

$$2.6 < (R7+R8)/(R7-R8) < 4.5 \tag{10-2}$$

$$2.8 < (R7+R8)/(R7-R8) < 4.0 \tag{10-3}$$

In the present embodiment, the first lens group G1 includes the first lens L11, the second lens L12, the third lens L13, and the fourth lens L14 in this order from the object side. When the distance between the third lens L13 and the fourth lens L14 is D6 and the focal length of the entire system is f, conditional formula (11) below is satisfied:

$$0.1 < D6/f < 1.5 \tag{11}$$

Note that the distance D6 is the distance between surfaces which are the image-side surface of the third lens L13 and the object-side surface of the fourth lens L14.

Particularly, the value of D6/f is 0.38 in Example 1 as shown in Table 15.

Configuring the value of D6/f to be less than the upper limit defined by conditional formula (11) facilitates miniaturization of the lens system. In contrast, configuring the value of D6/f to be greater than the lower limit defined by conditional formula (11) facilitates securing a long back focus. Note that the lens power arrangement of the first lens L11 through the fourth lens L14 is not limited to the power arrangement in the present embodiment to obtain the advantageous effect described above.

In order to further enhance the above advantageous effect obtained by satisfying conditional formula (11), it is preferable for the upper limit of the condition defined by conditional formula (11) to be 1.3, more preferably 1.0, even more preferably 0.8, and still more preferably 0.5. Further, in order to enhance the above advantageous effect further, it is more preferable for the lower limit of the condition defined by conditional formula (11) to be 0.15, even more preferably 0.2, and still more preferably 0.22. That is, the above advantageous effect will be enhanced further by satisfying conditional formulas (11-1), (11-2), or (11-3), for example:

$$0.15 < D6/f < 1.3 \tag{11-1}$$

$$0.2 < D6/f < 1.0 \tag{11-2}$$

$$0.22 < D6/f < 0.8 \tag{11-3}$$

In the present embodiment, the first lens group G1 includes the first lens L11, the second lens L12, and the third lens L13 in this order from the object side. When the distance between the second lens L12 and the third lens L13 is D4 and the focal length of the entire system is f, conditional formula (12) below is satisfied:

$$0.1 < D4/f < 1.5 \tag{12}$$

Note that the distance D4 is the distance between surfaces which are the image-side surface of the second lens L12 and the object-side surface of the third lens L13. Particularly, the value of D4/f is 0.34 in Example 1 as shown in Table 15.

Configuring the value of D4/f to be less than the upper limit defined by conditional formula (12) facilitates preventing the distance between the second lens L12 and the third lens L13 from excessively widening. This makes it easy to reduce the diameters of these lenses. In contrast, configuring the value of D4/f to be greater than the lower limit defined by conditional formula (12) widens the distance between the second lens L12 and the third lens L13 so that separation of the central rays and the peripheral rays in these lenses will be facilitated. As the result thereof, both widening the angle of view and correcting distortion will be facilitated. Note that the lens power arrangement of the first lens L11 through the third lens L13 is not limited to the power arrangement in the present embodiment to obtain the advantageous effect described above.

In order to further enhance the above advantageous effect obtained by satisfying conditional formula (12), it is preferable for the upper limit of the condition defined by conditional formula (12) to be 1.2, more preferably 1.0, even more preferably 0.7, and still more preferably 0.5. Further, in order to enhance the above advantageous effect further, it is more preferable for the lower limit of the condition defined by conditional formula (12) to be 0.15, even more preferably 0.2, and still more preferably 0.21. That is, the above advantageous effect will be enhanced further by satisfying conditional formulas (12-1), (12-2), or (12-3), for example:

$$0.15 < D4/f < 1.2 \tag{12-1}$$

$$0.2 < D4/f < 1.0 \tag{12-2}$$

$$0.21 < D4/f < 0.7 \tag{12-3}$$

In the present embodiment, the first lens group G1 includes the first lens L11 and the second lens L12 in this order from the object side. When the focal length of the first lens L11 is f1 and the focal length of the second lens L12 is f2, conditional formula (13) below is satisfied:

$$-3.0 < f1/f2 < 0.05 \tag{13}$$

Particularly, the value of f1/f2 is −0.35 in Example 1 as shown in Table 15.

Configuring the value of f1/f2 to be less than the upper limit defined by conditional formula (13) facilitates preventing the power of the first lens L11 from excessively increasing or facilitates preventing the power of the second lens L12 from excessively decreasing. This makes it easy to widen the angle of view. In contrast, configuring the value of f1/f2 to be greater than the lower limit defined by conditional formula (13) facilitates preventing the power of the first lens L11 from excessively decreasing. This makes it easy to correct distortion. Note that the lens power arrangement of the first lens L11 and the second lens L12 is not limited to the power arrangement in the present embodiment to obtain the advantageous effect described above.

In order to further enhance the above advantageous effect obtained by satisfying conditional formula (13), it is more preferable for the upper limit of the condition defined by conditional formula (13) to be −0.2, and even more preferably −0.25. Further, in order to enhance the above advantageous effect further, it is more preferable for the lower limit of the condition defined by conditional formula (13) to be −1.8, even more preferably −1.5, and still more preferably −1.0. That is, the above advantageous effect will be enhanced further by satisfying conditional formulas (13-1), (13-2), or (13-3), for example:

$$-1.8 < f1/f2 < -0.2 \tag{13-1}$$

$$-1.5 < f1/f2 < -0.25 \tag{13-2}$$

$$-1.0 < f1/f2 < -0.25 \tag{13-3}$$

In the present embodiment, the first lens group G1 includes the first lens L11 which is disposed on the most-object side. When the distance between the object-side surface of the first lens L11 and the imaging plane (the back focus corresponds to the air converted length) is L and the focal length of the entire system is f, conditional formula (14) below is satisfied:

$$2.0 < L/f < 8.0 \tag{14}$$

Particularly, the value of L/f is 5.16 in Example 1 as shown in Table 15.

Configuring the value of L/f to be less than the upper limit defined by conditional formula (14) facilitates miniaturization of the lens system. In contrast, configuring the value of L/f to be greater than the lower limit defined by conditional formula (14) facilitates widening the angle of view. Note that the power of the first lens L11 is not limited to the power in the present embodiment to obtain the advantageous effect described above.

In order to further enhance the above advantageous effect obtained by satisfying conditional formula (14), it is more preferable for the upper limit of the condition defined by conditional formula (14) to be 7.5, even more preferably 7.0, and still more preferably 6.0. Further, in order to enhance the above advantageous effect further, it is preferable for the lower limit of the condition defined by conditional formula (14) to be 2.5, more preferably 3.0, even more preferably 3.5, and still more preferable 4.0. That is, the above advantageous effect will be enhanced further by satisfying conditional formulas (14-1), (14-2), or (14-3), for example:

$$2.5 < L/f < 7.5 \tag{14-1}$$

$$3.0 < L/f < 7.0 \tag{14-2}$$

$$3.5 < L/f < 6.0 \tag{14-3}$$

In the present embodiment, when the back focus (air converted length) is Bf and the focal length of the entire system is f, conditional formula (15) below is satisfied:

$$0.3 < Bf/f < 3.0 \tag{15}$$

Particularly, the value of Bf/f is 1.21 in Example 1 as shown in Table 15.

Configuring the value of Bf/f to be less than the upper limit defined by conditional formula (15) facilitates preventing the back focus from becoming too long. This makes it easy to miniaturize the lens system. In contrast, configuring the value of Bf/f to greater than the lower limit defined by conditional formula (15) facilitates preventing the back focus from becoming too short. Thereby, disposing various types of filters and a cover glass between the image sensor and the lens system will be facilitated, and it will be possible to apply the imaging lens of the present embodiment for use in a wider variety of imaging apparatuses.

In order to further enhance the above advantageous effect obtained by satisfying conditional formula (15), it is more preferable for the upper limit of the condition defined by conditional formula (15) to be 2.5, even more preferably 2.0, and still more preferably 1.8. Further, in order to enhance the above advantageous effect further, it is preferable for the lower limit of the condition defined by conditional formula (15) to be 0.5, more preferably 0.8, and even more preferably 1.0. That is, the above advantageous effect will be enhanced further by satisfying conditional formulas (15-1), (15-2), or (15-3), for example:

$$0.5 < Bf/f < 2.5 \tag{15-1}$$

$$0.8 < Bf/f < 2.0 \tag{15-2}$$

$$1.0 < Bf/f < 1.8 \tag{15-3}$$

In the present embodiment, the first lens group G1 includes the first lens L11 and the second lens L12 in this order from the object side. When the radius of curvature of the object-side surface of the first lens L11 is R1 and the radius of curvature of the image-side surface of the second lens L12 is R2, conditional formula (16) below is satisfied:

$$-5.0 < (R1+R2)/(R1-R2) < -0.2 \tag{16}$$

Particularly, the value of (R1+R2)/(R1−R2) is −0.95 in Example 1 as shown in Table 15.

Configuring the value of (R1+R2)/(R1−R2) to be less than the upper limit defined by conditional formula (16) facilitates increasing the radius of curvature of the image-side surface of the second lens L12. This makes it easy to correct comatic aberration and astigmatism. In contrast, configuring the value of (R1+R2)/(R1−R2) to be greater than the lower limit defined by conditional formula (6) facilitates increasing the power of the first lens L11. This makes it easy to correct distortion. Note that the power arrangement of the first lens L11 and the second lens L12 is not limited to the power arrangement in the present embodiment to obtain the advantageous effect described above.

In order to further enhance the above advantageous effect obtained by satisfying conditional formula (16), it is more preferable for the upper limit of the condition defined by conditional formula (16) to be −0.3, even more preferably −0.4, and still more preferably −0.6. Further, in order to enhance the above advantageous effect further, it is preferable for the lower limit of the condition defined by conditional formula (16) to be −4.0, more preferably −3.0, and even more preferably −2.0. That is, the above advantageous effect will be enhanced further by satisfying conditional formulas (16-1), (16-2), or (16-3), for example:

$$-4.0 < (R1+R2)/(R1-R2) < -0.3 \quad (16\text{-}1)$$

$$-3.0 < (R1+R2)/(R1-R2) < -0.4 \quad (16\text{-}2)$$

$$-2.0 < (R1+R2)/(R1-R2) < -0.6 \quad (16\text{-}3).$$

In the present embodiment, the first lens group G1 includes the first lens L11, the second lens L12, the third lens L13, the fourth lens L14, and the fifth lens L15 in this order from the object side. When the radius of curvature of the object-side surface of the fifth lens L15 and the radius of curvature of the image-side surface of the fifth lens L15 are respectively R9 and R10, conditional formula (17) below is satisfied:

$$-5.0 < (R9+R10)/(R9-R10) < -0.2 \quad (17).$$

Particularly, the value of (R9+R10)/(R9−R10) is −1.00 in Example 1 as shown in Table 15.

Configuring the fifth lens L15 to be a positive lens and the value of (R9+R10)/(R9−R10) to be less than the upper limit defined by conditional formula (17) facilitates having the radius of curvature of the object-side surface of the fifth lens L15 smaller than the radius of curvature of the image-side surface thereof. This further makes it easy to correct astigmatism. In contrast, configuring the fifth lens 115 to be a positive lens and the value of (R9+R10)/(R9−R10) to be greater than the lower limit defined by conditional formula (17) facilitates increasing the difference between the radius of curvature of the object-side surface of the fifth lens L15 and the radius of curvature of the image-side surface thereof. Accordingly, it will be easy to increase the power of the fifth lens L15, thereby facilitating correction of spherical aberration. Note that the lens power arrangement of the first lens L11 through the fifth lens L15 is not limited to the power arrangement in the present embodiment to obtain the advantageous effect described above.

In order to further enhance the above advantageous effect obtained by satisfying conditional formula (17), it is more preferable for the upper limit of the condition defined by conditional formula (17) to be −0.3, even more preferably −0.4, and still more preferably −0.5. Further, in order to enhance the above advantageous effect further, it is preferable for the lower limit of the condition defined by conditional formula (17) to be −4.0, more preferably −3.0, and even more preferably −2.0. That is, the above advantageous effect will be enhanced further by satisfying conditional formulas (17-1), (17-2), or (17-3), for example:

$$-4.0 < (R9+R10)/(R9-R10) < -0.3 \quad (17\text{-}1)$$

$$-3.0 < (R9+R10)/(R9-R10) < -0.4 \quad (17\text{-}2)$$

$$-2.0 < (R9+R10)/(R9-R10) < -0.5 \quad (17\text{-}3).$$

Next, specific Examples of the imaging lens of the present invention will be described.

Example 1

A cross-sectional view illustrating the lens configuration of an imaging lens of Example 1 is shown in FIG. 2. Referring to FIG. 2, a schematic configuration of the imaging lens of Example 1 will be described. This imaging lens consists of a first lens group G1 having a positive refractive power and a second lens group G2 having a positive refractive power in this order from the object side along the optical axis Z. Focusing is performed by moving the entirety of the second lens group G2 along the optical axis Z.

The first lens group G1 consists of a positive first lens L11, a negative second lens L12, a negative third lens L13, a positive fourth lens L14, a positive fifth lens L15, a negative sixth lens L16, a negative seventh lens L17, a positive eighth lens L18, and a positive ninth lens L19 in this order from the object side along the optical axis Z. Note that the seventh lens L17 and the eighth lens L18 are cemented to each other.

Meanwhile, the second lens group G2 consists of a positive lens L21, a negative lens L22, a positive lens L23, a negative lens L24, a positive lens L25, and a positive lens L26 in this order from the object side along the optical axis Z. Note that the positive lens L23 and the negative lens L24 are cemented to each other.

An aperture stop St is disposed between the first lens group G1 and the second lens group G2. In this case, the aperture stop St shown in FIG. 2 does not necessarily represent the size or shape thereof, but the position thereof on the optical axis Z. FIG. 2 illustrates an example in which a plane parallel optical member PP that presumes various types of filters, a cover glass, and the like is disposed between the second lens group G2 and the imaging plane Sim.

The first lens group G1 includes one cemented lens formed by cementing the seventh lens L17 and the eighth lens L18 together. This cemented lens is formed by cementing the eighth lens L18 which is one positive lens and the seventh lens L17 which is one negative lens together. Configuring the first lens group G1 to include such a cemented lens enables longitudinal chromatic aberration and lateral chromatic aberration to be corrected favorably.

Further, each of a lens which is first from the most-image side of the first lens group G1, i.e., the ninth lens L19, a lens which is second from the most-image side of the first lens group G1, i.e., the eighth lens L18, and a lens which is third from the most-image side of the first lens group G1, i.e., the seventh lens L17 is a meniscus lens. This facilitates correction of spherical aberration, astigmatism, and comatic aberration.

Further, each of a lens which is first from the most-image side of the first lens group G1, i.e., the ninth lens L19, a lens which is second from the most-image side of the first lens group G1, i.e., the eighth lens L18, and a lens which is third from the most-image side of the first lens group G1, i.e., the seventh lens L17 is a lens with a convex surface toward the image side. This facilitates correction of spherical aberration and astigmatism.

The most-image-side lens of the first lens group G1, i.e., the ninth lens L19 is a positive meniscus lens. This facilitates favorable correction of astigmatism and comatic aberration. Further, the above positive meniscus lens is a positive meniscus lens with a convex surface toward the image side, in particular. This facilitates correction of astigmatism and comatic aberration.

The first lens L11 is a biconvex lens. This facilitates increasing the power of the first lens L11, thereby making it easy to correct distortion.

Further, the first lens L11 is configured to have the absolute value of the radius of curvature of the object-side surface thereof which is smaller than the absolute value of the radius of curvature of the image-side surface thereof (refer to Table 1 to be described later). This facilitates correction of astigmatism and distortion.

Further, the second lens L12 is a concave meniscus lens with a convex surface toward the object side. This facilitates correction of distortion.

The third lens L13 is a biconcave lens. This facilitates widening the angle of view.

Further, the third lens L13 is configured to have the absolute value of the radius of curvature of the object-side surface thereof which is greater than the absolute value of the radius of curvature of the image-side surface thereof (refer to Table 1 to be described later). This facilitates correction of field curvature.

Further, configuring the fourth lens L14 to be a positive lens facilitates correction of spherical aberration and astigmatism.

In addition, the fourth lens L14 is a meniscus lens with a convex surface toward the image side. This also facilitates correction of spherical aberration and astigmatism.

Further, configuring the fifth lens L15 to be a positive lens facilitates correction of spherical aberration.

The fifth lens L15 is configured to be a lens with a convex surface toward the object side. This facilitates correction of spherical aberration and astigmatism.

Further, the fifth lens L15 is configured to be a planoconvex lens with a convex surface toward the object side, in particular. This facilitates correction of spherical aberration and astigmatism.

Configuring the sixth lens L16 to be a negative lens enables spherical aberrations and astigmatism as well as longitudinal chromatic aberration and lateral chromatic aberration to be corrected favorably.

The sixth lens L16 is configured to be a biconcave lens, in particular. This enables spherical aberrations and astigmatism as well as longitudinal chromatic aberration and lateral chromatic aberration to be corrected favorably.

Further, the sixth lens L16 is configured to have the absolute value of the radius of curvature of the object-side surface thereof which is greater than the absolute value of the radius of curvature of the image-side surface thereof (refer to Table 1 to be described later). This facilitates correction of spherical aberration and astigmatism.

Further, the seventh lens L17 is a meniscus lens with a concave surface toward the object side. This facilitates correction of spherical aberration and astigmatism.

Configuring the seventh lens L17 to be a negative lens facilitates correction of spherical aberration and astigmatism.

Further, the eighth lens L18 is a meniscus lens with a concave surface toward the object side. This facilitates correction of spherical aberration and astigmatism.

Configuring the eighth lens L18 to be a positive lens facilitates correction of spherical aberration and astigmatism.

The seventh lens L17 and the eighth lens L18 are cemented to each other. This enables longitudinal chromatic aberration and lateral chromatic aberration to be corrected favorably.

The ninth lens L19 is configured to be a meniscus lens with a concave surface toward the object side. This facilitates correction of spherical aberration and astigmatism.

Configuring the ninth lens L19 to be a positive lens facilitates correction of spherical aberration and astigmatism.

Meanwhile, the second lens group G2 includes a cemented lens formed by cementing the positive lens L23 and the negative lens L24 to each other. Configuring the second lens group G2 to include at least one such a cemented lens enables longitudinal chromatic aberration and lateral chromatic aberration to be corrected favorably.

The second lens group G2 is configured to include two negative lenses L22 and L24. Configuring the second lens group G2 to include at least two or more such negative lenses facilitates correction of longitudinal chromatic aberration and lateral chromatic aberration.

The most-object-side lens of the second lens group G2 is a positive lens L21. This facilitates correction of astigmatism.

The above positive lens L21 which is the most-object-side lens of the second lens group G2 is particularly a biconvex lens. This facilitates correction of astigmatism.

Further, the positive lens L21 which is the most-object-side lens of the second lens group G2 is configured to have the absolute value of the radius of curvature of the object-side surface which is smaller than the absolute value of the radius of curvature of the image-side surface (refer to Table 1 to be described later). This facilitates correction of astigmatism.

A lens which is second from the object side of the second lens group G2 is a negative lens L22. This facilitates correction of spherical aberration and astigmatism as well as longitudinal chromatic aberration and lateral chromatic aberration.

A lens which is third from the object side of the second lens group G2 is a positive lens L23. This facilitates correction of spherical aberration and astigmatism.

A lens which is fourth from the object side of the second lens group G2 is a negative lens L24. This facilitates correction of spherical aberration and astigmatism as well as longitudinal chromatic aberration and lateral chromatic aberration.

The positive lens L23 which is a lens that is third from the object side of the second lens group G2 and the negative lens L24 which is a lens that is fourth from the object side of the second lens group G2 are cemented to each other. This facilitates correction of longitudinal chromatic aberration and lateral chromatic aberration.

A lens which is fifth from the object side of the second lens group G2 is a positive lens L25. This facilitates suppression of the angles at which the peripheral rays enter the image sensor.

A lens which is sixth from the object side of the second lens group G2 is a positive lens L26. This facilitates suppression of the angles at which the peripheral rays enter the image sensor.

The most-image-side lens of the second lens group G2 is the positive lens L26. Configuring the most-image-side lens of the second lens group G2 to be a positive lens in such a manner facilitates suppression of the angles at which the peripheral rays enter the image sensor.

The lens which is second from the most-image side of the second lens group G2 is the positive lens L25. Configuring the lens which is second from the most-image side of the second lens group G2 to be a positive lens in such a manner facilitates suppression of the angles at which the peripheral rays enter the image sensor.

Further, each of the positive lens L26 which is the most-image-side lens of the second lens group G2 and the positive lens L25 which is the lens that is second from the most-image side in the second lens group G2 is a lens with a convex surface toward the image side, in particular. This facilitates suppression of the angles at which the peripheral rays enter the image sensor.

Further, the object-side surface of the first lens L11 which is the most-object-side lens of the first lens group G1, the image-side surface of the ninth lens L19 which is the most-image-side lens of the first lens group G1, the object-side surface of the positive lens L21 which is the most-object-side lens of the second lens group G2, and the image-side surface of the positive lens L26 which is the most-image-side lens of the second lens group G2 are all convex surfaces. This facilitates correction of astigmatism, comatic aberration, and distortion.

Table 1 shows basic lens data of the imaging lens of Example 1. The column Si shows the i-th (i=1, 2, 3, . . . ) surface number, the value of i sequentially increasing from the object-side surface of the constituent element at the most object side, which is designated as 1, toward the image side. The column Ri shows the radii of curvature of the i-th surface, and the column Di shows the distances between i-th surfaces and (i+1)th surfaces along the optical axis Z.

Further, the column Ndj shows the refractive indices of j-th (j=1, 2, 3, . . . ) optical elements with respect to the d-line (wavelength: 587.6 nm), the value of j sequentially increasing from the constituent element at the most object side, which is designated as 1, toward the image side. The column vdj shows the Abbe numbers of j-th optical elements with respect to the d-line (wavelength: 587.6 nm). The column of θg,Fj shows the partial dispersion ratios of j-th (j=1, 2, 3, . . . ) optical elements with respect to the g-line (wavelength: 435.8 nm) and the F-line (wavelength: 486.1 nm). Names of the materials are written in the column on the right side thereof.

Note that the lens data also shows the aperture stop St and the optical member PP. Further, the column of the surface number of a surface corresponding to the aperture stop St indicates a surface number (Stop). The sign of the radius of curvature is positive in the case that a surface shape is convex on the object side, and negative in the case that the surface shape is convex on the image side. The value in the lowest column of Di represents the distance between the image-side surface of the optical member PP and the imaging plane Sim. Further, Table 1 shows the numerical values which are rounded to a predetermined number of digits as appropriate.

As specs with respect to the d-line of the imaging lens of Example 1, Table 2 shows values of the focal length f of the entire system, the back focus (air converted length) Bf, the F-number Fno., and the total angle of view 2ω. Degrees are used as the unit of the total angle of view 2ω. The values of the focal length f of the entire system and the back focus Bf are normalized such that the former becomes 1.00. Accordingly, no units are employed for the focal length f of the entire system and the back focus Bf. Note that the values of the radius of curvature Ri and the distance between surfaces Di are also normalized in the same manner as described above.

The manner in which Table 1 is shown as described above is the same for Tables 3, 5, 7, 9, 11, and 13 to be described later. Further, the manner in which Table 2 is shown is the same for Tables 4, 6, 8, 10, 12, and 14 to be described later.

TABLE 1

Example 1/Lens Data

| Si Surface Numbers | Ri Radii of Curvature | Di Distances Between Surfaces | Ndj Refractive Indices | vdj Abbe Numbers | θg, Fj Partial Dispersion Ratios | Names of Materials |
| --- | --- | --- | --- | --- | --- | --- |
| 1 | 3.11242 | 0.1817 | 1.83481 | 42.73 | 0.56486 | S-LAH55V |
| 2 | −110.65537 | 0.0069 | | | | |
| 3 | 1.55675 | 0.0759 | 1.49700 | 81.54 | 0.53748 | S-FPL51 |
| 4 | 0.68679 | 0.3437 | | | | |
| 5 | −2.18192 | 0.0517 | 1.84661 | 23.78 | 0.62072 | S-TIH53 |
| 6 | 1.18063 | 0.3789 | | | | |
| 7 | −2.54861 | 0.2079 | 1.90366 | 31.32 | 0.59481 | TAFD25 |
| 8 | −1.48287 | 0.0334 | | | | |
| 9 | 1.34965 | 0.1655 | 1.90366 | 31.32 | 0.59481 | TAFD25 |
| 10 | ∞ | 0.2248 | | | | |
| 11 | −12.28776 | 0.0517 | 1.57501 | 41.50 | 0.57672 | S-TIL27 |
| 12 | 1.87326 | 0.1293 | | | | |
| 13 | −1.30818 | 0.0521 | 1.84661 | 23.78 | 0.62072 | S-TIH53 |
| 14 | −3.45566 | 0.1034 | 1.49700 | 81.54 | 0.53748 | S-FPL51 |
| 15 | −1.82957 | 0.0069 | | | | |
| 16 | −6.02933 | 0.1189 | 1.84661 | 23.78 | 0.62072 | S-TIH53 |
| 17 | −1.60481 | 0.0793 | | | | |
| 18(Stop) | ∞ | 0.2299 | | | | |
| 19 | 3.35631 | 0.0886 | 1.80400 | 46.57 | 0.55724 | S-LAH65 |
| 20 | −7.29650 | 0.2045 | | | | |
| 21 | 9.60747 | 0.0414 | 1.62588 | 35.70 | 0.58935 | S-TIM1 |

TABLE 1-continued

Example 1/Lens Data

| Si Surface Numbers | Ri Radii of Curvature | Di Distances Between Surfaces | Ndj Refractive Indices | vdj Abbe Numbers | θg, Fj Partial Dispersion Ratios | Names of Materials |
|---|---|---|---|---|---|---|
| 22 | 1.10598 | 0.0500 | | | | |
| 23 | 2.60843 | 0.3175 | 1.49700 | 81.54 | 0.53748 | S-FPL51 |
| 24 | −0.61801 | 0.2045 | 1.84661 | 23.78 | 0.62072 | S-TIH53 |
| 25 | −1.42137 | 0.0069 | | | | |
| 26 | −13.17290 | 0.0803 | 1.57099 | 50.80 | 0.55887 | S-BAL2 |
| 27 | −3.29527 | 0.3510 | | | | |
| 28 | ∞ | 0.1672 | 1.58913 | 61.14 | 0.54067 | S-BAL35 |
| 29 | −1.46758 | 0.8775 | | | | |
| 30 | ∞ | 0.0793 | 1.51633 | 64.14 | 0.53531 | S-BSL7 |
| 31 | ∞ | 0.2757 | | | | |

TABLE 2

Example 1/Specs (d-line)

| Zoom Ratios | 1.0 |
| f | 1.00 |
| Bf | 1.21 |
| FNo. | 1.90 |
| 2ω[°] | 58.4 |

Referring to Table 1 below, the Abbe number, the partial dispersion ratio, and the refractive index of each of the lenses which constitutes the imaging lens of Example 1 will be described.

The Abbe number vd1 of the first lens L11 is 42.73. This value satisfies the suitable numerical conditions with respect to the first lens described above, i.e., the conditions that the Abbe number vd1 is greater than or equal to 30, and more preferably greater than or equal to 35. In the case that the Abbe number vd1 of the first lens L11 is greater than or equal to 30, correction of longitudinal chromatic aberration and lateral chromatic aberration will be facilitated. This advantageous effect will become more prominent in the case that the Abbe number vd1 of the first lens L11 is greater than or equal to 35.

The Abbe number vd2 of the second lens L12 is 81.54. This value satisfies the suitable numerical conditions with respect to the second lens described above, i.e., the conditions that the Abbe number vd2 is greater than or equal to 50, more preferably greater than or equal to 55, even more preferably greater than or equal to 60, and still more preferably greater than or equal to 65. In the case that the Abbe number vd2 of the second lens L12 is greater than or equal to 50, correction of longitudinal chromatic aberration and lateral chromatic aberration will be facilitated. This advantageous effect will become more prominent in the case that the Abbe number vd2 of the second lens L12 is greater than or equal to 55, even more prominent in the case that the Abbe number vd2 of the second lens L12 is greater than or equal to 60, and still more prominent in the case that the Abbe number vd2 of the second lens L12 is greater than or equal to 65.

The Abbe number vd3 of the third lens L13 is 23.78. This value satisfies the suitable numerical conditions with respect to the third lens described above, i.e., the conditions that the Abbe number vd3 is less than or equal to 30, more preferably less than or equal to 28, and even more preferably less than or equal to 27. In the case that the Abbe number vd3 of the third lens L13 is less than or equal to 30, correction of longitudinal chromatic aberration and lateral chromatic aberration will be facilitated. This advantageous effect will become more prominent in the case that the Abbe number vd3 of the third lens L13 is less than or equal to 28, and even more prominent in the case that the Abbe number vd3 of the third lens L13 is less than or equal to 27.

Further, the above Abbe number of the third lens L13 which is 23.78 also satisfies other suitable numerical conditions with respect to the third lens described above, i.e., the condition that the Abbe number vd3 is greater than or equal to 20. In the case that the Abbe number vd3 is greater than or equal to 20, reduction in the cost of the material for the third lens L13 will be facilitated.

Further, the partial dispersion ratio θg,F3 of the third lens L13 is 0.62072. This value and the above Abbe number of 23.78 satisfy the suitable numerical conditions with respect to the third lens described above, i.e., the conditions that the Abbe number vd3 is between 15 and 30; and the partial dispersion ratio θg,F3 is greater than or equal to 0.6, and more preferably greater than or equal to 0.61. In the case that the Abbe number vd3 of the third lens L13 is between 15 and 30 and the partial dispersion ratio θg,F3 is greater than or equal to 0.6, correction of lateral chromatic aberration will be facilitated. Further, this advantageous effect will become more prominent in the case that the partial dispersion ratio is greater than or equal to 0.61.

The Abbe number vd4 of the fourth lens L14 is 31.32. This value satisfies the suitable numerical conditions with respect to the fourth lens described above, i.e., the conditions that the Abbe number vd4 is less than or equal to 40, and more preferably less than or equal to 35. In the case that the Abbe number vd4 of the fourth lens L14 is less than or equal to 40, favorable correction of longitudinal chromatic aberration and lateral chromatic aberration will be facilitated. This advantageous effect will become more prominent in the case that the Abbe number vd4 is less than or equal to 35.

The partial dispersion ratio θg,F4 of the fourth lens L14 is 0.59481. This value and the above Abbe number of 31.32 satisfy the suitable numerical conditions with respect to the fourth lens described above, i.e., the conditions that the Abbe number vd4 is between 22 and 40 and the partial dispersion ratio θg,F4 is greater than or equal to 0.58. In the case that the above Abbe number vd4 of the fourth lens L14 is between 22 and 40 and the partial dispersion ratio θg,F4 is greater than or equal to 0.58, correction of lateral chromatic aberration will be facilitated.

The Abbe number vd5 of the fifth lens L15 is 31.32. This value satisfies the suitable numerical conditions with respect to the fifth lens described above, i.e., the conditions that the Abbe number vd5 is less than or equal to 40, and more preferably less than or equal to 35. In the case that the Abbe number vd5 of the fifth lens L15 is less than or equal to 40, favorable correction of longitudinal chromatic aberration and lateral chromatic aberration will be facilitated. This advantageous effect will become more prominent in the case that the Abbe number vd5 is less than or equal to 35.

The partial dispersion ratio θg,F5 of the fifth lens L15 is 0.59481. This value and the above Abbe number of 31.32 satisfy the suitable numerical conditions with respect to the fifth lens described above, i.e., the conditions that the Abbe number vd5 is between 22 and 40 and the partial dispersion ratio θg,F5 is greater than or equal to 0.58. In the case that the above Abbe number vd5 of the fifth lens L15 is between 22 and 40 and the partial dispersion ratio θg,F5 is greater than or equal to 0.58, correction of lateral chromatic aberration will be facilitated.

The Abbe number vd6 of the sixth lens L16 is 41.50. This value satisfies the suitable numerical conditions with respect to the sixth lens described above, i.e., the conditions that the Abbe number vd6 is less greater or equal to 25, and more preferably greater than or equal to 30. In the case that the Abbe number vd6 of the sixth lens L16 is greater than or equal to 25, favorable correction of longitudinal chromatic aberration will be facilitated. This advantageous effect will become more prominent in the case that the Abbe number vd6 is greater than or equal to 30.

The Abbe number vd6 of the sixth lens L16 which is 41.50 satisfies another suitable numerical conditions described above, i.e., the conditions that the Abbe number vd6 is less than or equal to 55, and more preferably less than or equal to 50. In the case that the Abbe number vd6 of the sixth lens L16 is less than or equal to 55, correction of lateral chromatic aberration will be facilitated. This advantageous effect will become more prominent in the case that the Abbe number vd6 is less than or equal to 50.

The Abbe number of the seventh lens L17 is 23.78. This value satisfies the suitable numerical conditions with respect to the seventh lens described above, i.e., the conditions that the Abbe number vd7 is greater than or equal to 15, more preferably greater than or equal to 18, and even more preferably greater than or equal to 20. In the case that the Abbe number vd7 of the seventh lens L17 is greater than or equal to 15, reduction in the cost of the material for the seventh lens L17 will be facilitated. This advantageous effect will become more prominent in the case that the Abbe number vd7 is greater than or equal to 18, and even more prominent in the case that the Abbe number vd7 is greater than or equal to 20.

The Abbe number vd7 of the seventh lens L17 which is 23.78 also satisfies another suitable numerical conditions with respect to the seventh lens described above, i.e., the conditions that the Abbe number vd7 is less than or equal to 33, more preferably less than or equal to 30, and even more preferably less than or equal to 28. In the case that the Abbe number vd7 of the seventh lens L17 is less than or equal to 33, correction of longitudinal chromatic aberration and lateral chromatic aberration will be facilitated. This advantageous effect will become more prominent in the case that the Abbe number vd7 is less than or equal to 30, and even more prominent in the case that the Abbe number vd7 is less than or equal to 28.

The Abbe number vd8 of the eighth lens L18 is 81.54. This value satisfies the suitable numerical conditions with respect to the eighth lens described above, i.e., the conditions that the Abbe number vd8 is greater than or equal to 50, more preferably greater than or equal to 55, even more preferably greater than or equal to 60, and still more preferably greater than or equal to 70. In the case that the Abbe number vd8 of the eighth lens L18 is greater than or equal to 50, correction of longitudinal chromatic aberration and lateral chromatic aberration will be facilitated. This advantageous effect will become more prominent in the case that the Abbe number vd8 is greater than or equal to 55, even more prominent in the case that the Abbe number vd8 is greater than or equal to 60, and still more prominent in the case that the Abbe number vd8 is greater than or equal to 70.

Meanwhile, the Abbe number vd9 of the ninth lens L19 which is the most-image-side lens of the first lens group G1 is 23.78. This value satisfies the suitable numerical conditions with respect to the most-image-side lens of the first lens group described above, i.e., the conditions that the Abbe number vd9 is less than or equal to 40, more preferably less than or equal to 30, and even more preferably less than or equal to 28. In the case that the Abbe number of the most-image-side lens of the first lens group is less than or equal to 40, correction of longitudinal chromatic aberration will be facilitated. This advantageous effect will become more prominent in the case that the Abbe number is less than or equal to 30, and even more prominent in the case that the Abbe number is less than or equal to 28.

The Abbe number vd8 of the eighth lens L18 which is the lens that is second from the most-image side in the first lens group G1 is 81.54 as described above. This value satisfies the suitable numerical conditions with respect to the lens which is second from the most-image side in the first lens group described above, i.e., the conditions that the Abbe number vd8 is greater than or equal to 50, more preferably greater than or equal to 55, even more preferably greater than or equal to 60, and still more preferably greater than or equal to 65. In the case that the Abbe number of the lens which is second from the most-image side in the first lens group G1 is greater than or equal to 50, correction of longitudinal chromatic aberration and lateral chromatic aberration will be facilitated. This advantageous effect will become more prominent in the case that the Abbe number is greater than or equal to 55, even more prominent In the case that the Abbe number is greater than or equal to 60, and still more prominent in the case that the Abbe number is greater than or equal to 65.

The Abbe number vd7 of the seventh lens L17 which is the lens that is third from the most-image side in the first lens group G1 is 23.78 as described above. This value satisfies the suitable numerical conditions with respect to the lens which is third from the most-image side in the first lens group described above, i.e., the conditions that the Abbe number vd7 is less than or equal to 30, more preferably less than or equal to 28, and even more preferably less than or equal to 26. In the case that the Abbe number of the lens which is third from the most-image side in the first lens group G1 is less than or equal to 30, correction of longitudinal chromatic aberration will be facilitated. This advantageous effect will become more prominent in the case that the Abbe number is less than or equal to 28, and even more prominent in the case that the Abbe number is less than or equal to 26.

Meanwhile, the Abbe number vd10 of the positive lens L21 which is the most-object-side lens of the second lens group G2 is 46.57. This value satisfies the suitable numerical conditions with respect to the most-object-side lens of the second lens group described above, i.e., the conditions that the Abbe number vd10 is greater than or equal to 30, more preferably greater than or equal to 35, and even more preferably greater than or equal to 38. In the case that the Abbe number of the most-object-side lens of the second lens group is greater than or equal to 30, correction of longitudinal chromatic aberration will be facilitated. This advantageous effect will become more prominent in the case that the Abbe number is greater than or equal to 35, and even more prominent in the case that the Abbe number is less than or equal to 38.

The Abbe number vd11 of the negative lens L22 which is the lens that is second from the most-object side in the second lens group G2 is 35.70. This value satisfies the suitable numerical conditions with respect to the lens which is second from the most-object side in the second lens group described above, i.e., the conditions that the Abbe number vd11 is greater than or equal to 20, and more preferably greater than or equal to 30. In the case that the Abbe number of the lens which is second from the most-object side in the second lens group G2 is greater than or equal to 20, correction of longitudinal chromatic aberration and lateral chromatic aberration will be facilitated. This advantageous effect will become more prominent in the case that the Abbe number of the lens which is second from the most-object side in the second lens group G2 is greater than or equal to 30.

The Abbe number vd12 of the positive lens L23 which is the lens that is third from the most-object side in the second lens group G2 is 81.54. This value satisfies the suitable numerical conditions with respect to the lens which is third from the most-object side in the second lens group described above, i.e., the conditions that the Abbe number vd12 is greater than or equal to 40, more preferably greater than or equal to 50, and even more preferably greater than or equal to 60. In the case that the Abbe number of the lens which is third from the most-object side in the second lens group G2 is greater than or equal to 40, correction of longitudinal chromatic aberration and lateral chromatic aberration will be facilitated. This advantageous effect will become more prominent in the case that the Abbe number of the lens which is third from the most-object side in the second lens group G2 is greater than or equal to 50, and even more prominent in the case that the Abbe number is greater than or equal to 60.

The Abbe number vd13 of the negative lens L24 which is the lens that is fourth from the most-object side in the second lens group G2 is 23.78. This value satisfies the suitable numerical conditions with respect to the lens which is fourth from the most-object side in the second lens group described above, i.e., the conditions that the Abbe number vd13 is less than or equal to 30, more preferably less than or equal to 29, and even more preferably less than or equal to 28. In the case that the Abbe number of the lens which is fourth from the most-object side in the second lens group G2 is less than or equal to 30, correction of longitudinal chromatic aberration and lateral chromatic aberration will be facilitated. This advantageous effect will become more prominent in the case that the Abbe number of the lens which is fourth from the most-object side in the second lens group G2 is less than or equal to 29, and even more prominent in the case that the Abbe number is less than or equal to 28.

The second lens group G2 includes a cemented lens formed by cementing the positive lens L23 and the negative lens L24 together, as described above. The Abbe number vd12 of the positive lens L23 which constitutes this cemented lens is 81.54 as described above. This value satisfies the suitable numerical conditions with respect to the positive lens which constitutes the cemented lens of the second lens group described above, i.e., the conditions that the Abbe number vd12 is greater than or equal to 40, more preferably greater than or equal to 50, and even more preferably greater than or equal to 60. In the case that the Abbe number of the positive lens which constitutes the cemented lens used for the second lens group G2 is greater than or equal to 40, correction of longitudinal chromatic aberration and lateral chromatic aberration will be facilitated. This advantageous effect will become more prominent in the case that the Abbe number is greater than or equal to 50, and even more prominent in the case that the Abbe number is greater than or equal to 60.

The Abbe number vd13 of the negative lens L24 which constitutes the above cemented lens is 23.78 as described above. This value satisfies the suitable numerical conditions with respect to the negative lens which constitutes the cemented lens of the second lens group described above, i.e., the conditions that the Abbe number vd13 is less than or equal to 30, more preferably less than or equal to 29, and even more preferably less than or equal to 28. In the case that the Abbe number of the negative lens which constitutes the cemented lens used for the second lens group G2 is less than or equal to 30, correction of longitudinal chromatic aberration and lateral chromatic aberration will be facilitated. This advantageous effect will become more prominent in the case that the Abbe number is less than or equal to 29, and even more prominent in the case that the Abbe number is less than or equal to 28.

The Abbe number vd15 of the positive lens L26 which is the most-image-side lens of the second lens group G2 is 61.14. This value satisfies the suitable numerical conditions with respect to the most-image-side lens of the second lens group described above, i.e., the conditions that the Abbe number vd15 is greater than or equal to 40, more preferably greater than or equal to 45, and even more preferably greater than or equal to 50. In the case that the Abbe number of the most-image-side lens in the second lens group G2 is greater than or equal to 40, correction of lateral chromatic aberration will be facilitated. This advantageous effect will become more prominent in the case that the Abbe number is greater than or equal to 45, and even more prominent in the case that the Abbe number is greater than or equal to 50.

The Abbe number vd14 of the positive lens L25 which is the lens that is second from the most-image side in the second lens group G2 is 50.80. This value satisfies the suitable numerical conditions with respect to the lens that is second from the most-image side in the second lens group described above, i.e., the conditions that the Abbe number vd14 is greater than or equal to 40, more preferably greater than or equal to 45, and even more preferably greater than or equal to 48. In the case that the Abbe number of the lens that is second from the most-image side in the second lens group described above is greater than or equal to 40, correction of lateral chromatic aberration will be facilitated. This advantageous effect will become more prominent in the case that the Abbe number is greater than or equal to 45, and even more prominent in the case that the Abbe number is greater than or equal to 48.

Meanwhile, the refractive index Nd1 of the first lens L11 is 1.83481. This value satisfies the suitable numerical conditions with respect to the first lens described above, i.e., the conditions that the refractive index Nd1 is greater than 1.7, and more preferably greater than 1.75. In the case that the refractive index Nd1 of the first lens L11 is greater than 1.7, increasing the power of the first lens L11 will be facilitated and correcting distortion will be also facilitated. This advantageous effect will become prominent in the case that the refractive index Nd1 of the first lens L11 is greater than 1.75.

Further, the refractive index of the first lens L11 which is 1.83481 satisfies another suitable numerical condition with respect to the first lens described above, i.e., the condition that the refractive index is less than 1.9. In the case that the refractive index Nd1 of the first lens L11 is less than 1.9, suppression of the cost of the material for the first lens L11 will be facilitated.

Figure 9:
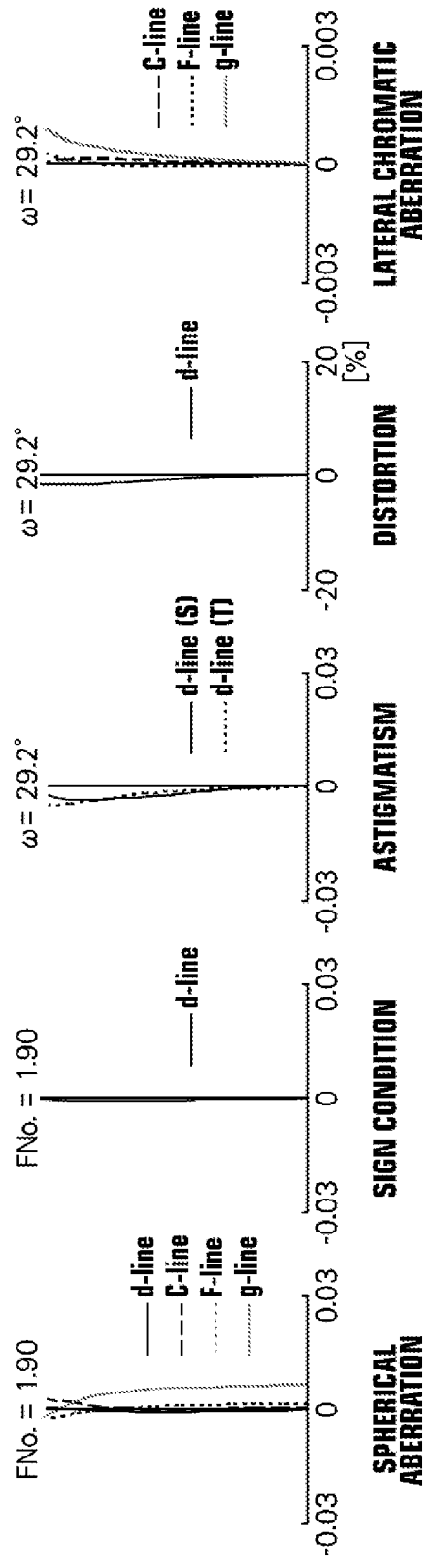
FIG. 9 illustrates aberration diagrams of the imaging lens of Example 1 described above.

FIG. 9 shows the respective aberration diagrams of the imaging lens of Example 1. FIG. 9 shows spherical aberration, sine condition, astigmatism, distortion, and lateral chromatic aberration in this order from the left to the right. Note that these aberrations are for when the imaging lens is focused on the object at infinity.

Each of the aberration diagrams of spherical aberration, sine condition, astigmatism, and distortion shows an aberration with respect to the d-line (wavelength: 587.6 nm) as the reference wavelength. The spherical aberration diagram illustrates aberrations with respect to the-d line, the C-line (wavelength of 656.3 nm), the F-line (wavelength of 486.1 nm), and the g-line (wavelength of 435.8 nm) respectively indicated by a solid line, a broken line, a dotted line, and a narrow line. In the astigmatism diagrams, the solid line illustrates aberration in the sagittal direction while the broken line illustrates aberration in the tangential direction. The lateral chromatic aberration diagram illustrates aberrations with respect to the c-line, the F-line and the g-line respectively indicated by the broken line, the dotted line, and the narrow line. Note that Fno. in the spherical aberration and the sign condition diagram represents the F-number, and ω in the other aberration diagrams represents the half angle of view.

The manner in which each of the aberration diagrams described above is shown is the same for FIGS. 10 through 15.

Example 2

A cross-sectional view illustrating the lens configuration of an imaging lens of Example 2 is shown in FIG. 3. Referring to FIG. 3, a schematic configuration of the imaging lens of Example 2 will be described. This imaging lens consists of a first lens group G1 having a positive refractive power and a second lens group G2 having a positive refractive power in this order from the object side along the optical axis Z. Focusing is performed by moving the entirety of the second lens group G2 along the optical axis Z.

The first lens group G1 consists of a positive first lens L11, a negative second lens L12, a negative third lens L13, a positive fourth lens L14, a positive fifth lens L15, a negative sixth lens L16, a negative seventh lens L17, a positive eighth lens L18, a positive ninth lens L19, and a positive tenth lens L110 in this order from the object side along the optical axis Z. Note that the seventh lens L17 and the eighth lens L18 are cemented to each other, and the ninth lens L19 and the tenth lens L110 are cemented to each other.

Meanwhile, the second lens group G2 consists of a positive lens L21, a negative lens L22, a positive lens L23, a negative lens L24, and a positive lens L25 in this order from the object side along the optical axis Z. Note that the positive lens L23 and the negative lens L24 are cemented to each other.

An aperture stop St is disposed between the first lens group G1 and the second lens group G2. FIG. 3 also shows the example in which a plane parallel optical member PP is disposed between the second lens group G2 and the imaging plane Sim.

As described above, when compared to the imaging lens of Example 1, the imaging lens of Example 2 basically differs from the imaging lens of Example 1 in that the first lens group G1 in Example 2 consists of ten lenses (nine lenses in Example 1) while the second lens group G2 in Example 2 consists of five lenses (six lenses in Example 1).

In the imaging lens of Example 2, the power arrangement of the first lens L11 through the ninth lens L19 toward the image side in the first lens group G1 is the same as the power arrangement in Example 1. However, the positive fifth lens L15 in the imaging lens of Example 1 is a planoconvex lens, whereas the fifth lens L15 in the imaging lens of Example 2 is a positive meniscus lens.

In the imaging lens of Example 2, the power arrangement of the positive lens L21 through the positive lens L25 toward the image side in the second lens group G2 is the same as the power arrangement in Example 1. However, the positive lens L25 in the imaging lens of Example 1 is a positive meniscus lens, whereas the positive lens L25 in the imaging lens of Example 2 is a biconvex lens.

The first lens group G1 includes a cemented lens formed by cementing the seventh lens L17 and the eighth lens L18 together. This cemented lens is formed by cementing one positive lens (the eighth lens L18) and one negative lens (the seventh lens L17) together. Configuring the first lens group G1 to include such a cemented lens enables longitudinal chromatic aberration and lateral chromatic aberration to be favorably corrected.

Each of a lens which is first from the most-image side in the first lens group G1, a lens which is second from the most-image side in the first lens group G1, and a lens which is third from the most-image side in the first lens group G1 which are respectively the tenth lens l10, the ninth lens L19, and the eighth lens L18 is a meniscus lens. Such a configuration facilitates correction of spherical aberration, astigmatism, and comatic aberration.

Each of a lens which is first from the most-image side in the first lens group G1, a lens which is second from the most-image side in the first lens group G1, and a lens which is third from the most-image side in the first lens group G1 which are respectively the tenth lens L10, the ninth lens L19, and the eighth lens L18 is a lens with a convex surface toward the image side. This facilitates correction of spherical aberration and astigmatism.

The most-image-side lens in the first lens group G1 which is the tenth lens L110 is configured to be a positive meniscus lens. This facilitates favorable correction of astigmatism and comatic aberration.

In the imaging lens of Example 2, the shape of each of the first lens L11 through the ninth lens L19 of the first lens group G1 is basically the same as that of the imaging lens of Example 1 except for the fifth lens L15 to be described later. Therefore, the advantageous effect obtained based on the shapes of the lenses L11 through L14 and lens L16 through L19 is also substantially the same as in Example 1.

A planoconvex lens is employed for the fifth lens L15 in the imaging lens of Example 1, whereas a positive meniscus lens with a convex surface toward the object side is employed for the fifth lens L15 in the imaging lens of Example 2. Configuring the fifth lens L15 to be a positive meniscus lens with a convex surface toward the object side also facilitates correction of spherical aberration and astigmatism.

The basic shape of each of the positive lens L21 through the positive lens L24 of the second lens group G2 is the same as that of the imaging lens of Example 1. Therefore, the advantageous effect obtained based on the shapes of these lenses L21 through L24 is also the same as in Example 1.

A positive meniscus lens is employed for the positive lens L25 in the imaging lens of Example 1, whereas a biconvex lens is employed for the positive lens L25 in the imaging lens of Example 2. In this case as well, configuring the most-image-side lens of the second lens group G2 to be the positive lens L25 facilitates suppression of the angles at which the peripheral rays enter the image sensor.

The positive lens L25 which is the most-image-side lens and the positive lens L24 which is the lens which is second from the most-image side in the second lens group G2 are lenses with convex surfaces toward the image side, in particular. This facilitates suppression of the angles at which the peripheral rays enter the image sensor.

The object-side surface of the first lens L11 which is the most-object-side lens of the first lens group G1, the image-side surface of the tenth lens L110 which is the most-image-side lens of the first lens group G1, the object-side surface of the positive lens L21 which is the most-object-side lens of the second lens group G2, and the image-side surface of the positive lens L25 which is the most-image-side lens of the second lens group G2 are all convex surfaces. This facilitates correction of astigmatism, comatic aberration, and distortion.

Table 3 shows basic lens data of the imaging lens of Example 2. Further, Table 4 shows specs of the imaging lens of Example 2 with respect to the d-line.

Referring to Table 3 below, the Abbe number, the partial dispersion ratio, and the refractive index of each of the lenses which constitute the imaging lens of Example 2 will be described.

All of the values of the Abbe numbers of the first lens L11 through the eighth lens L18 and the partial dispersion ratios of the fourth lens L14 and the fifth lens L15 satisfy the suitable numerical conditions described above. Therefore, the advantageous effect obtained by the values of these Abbe numbers and the partial dispersion ratios are also the same as those of Example 1.

Further, the Abbe number vd10 of the tenth lens L110 which is the most-image-side lens in the first lens group G1 is 23.78. This value satisfies the suitable numerical conditions with respect to the most-image-side lens of the first lens described above, i.e., the conditions that the Abbe number vd10 is less than or equal to 30, and more preferably less than or equal to 28. In the case that the Abbe number of the most-image-side lens of the first lens group G1 is less than or equal to 30, correction of longitudinal chromatic aberration and lateral chromatic aberration will be facilitated. This advantageous effect will become more prominent in the case that the Abbe number is less than or equal to 28.

The Abbe number vd9 of the ninth lens L19 which is the lens that is second from the most-image side in the first lens group G1 is 53.87. This value satisfies the suitable numerical conditions with respect to the lens that is second from the most-image side in the first lens group, i.e., the condition that the Abbe number vd9 is greater than or equal to 50. In the case that the Abbe number of the lens that is second from the most-image side in the first lens group G1 is greater than or equal to 50, correction of longitudinal chromatic aberration and lateral chromatic aberration will be facilitated.

TABLE 3

Example 2/Lens Data

| Si Surface Numbers | Ri Radii of Curvature | Di Distances Between Surfaces | Ndj Refractive Indices | vdj Abbe Numbers | θg, Fj Partial Dispersion Ratios | Names of Materials |
|---|---|---|---|---|---|---|
| 1 | 3.37287 | 0.1793 | 1.83481 | 42.73 | 0.56486 | S-LAH55V |
| 2 | −46.72174 | 0.0069 | | | | |
| 3 | 1.58542 | 0.0760 | 1.49700 | 81.54 | 0.53748 | S-FPL51 |
| 4 | 0.72283 | 0.3232 | | | | |
| 5 | −2.59940 | 0.0518 | 1.84661 | 23.78 | 0.62072 | S-TIH53 |
| 6 | 1.13076 | 0.3210 | | | | |
| 7 | −2.75548 | 0.2671 | 1.90366 | 31.32 | 0.59481 | TAFD25 |
| 8 | −1.52870 | 0.1449 | | | | |
| 9 | 1.33416 | 0.1899 | 1.90366 | 31.32 | 0.59481 | TAFD25 |
| 10 | 19.39212 | 0.2145 | | | | |
| 11 | −4.61895 | 0.0518 | 1.54814 | 45.79 | 0.56859 | S-TIL1 |
| 12 | 1.84686 | 0.1191 | | | | |
| 13 | −1.38631 | 0.0518 | 1.90366 | 31.32 | 0.59481 | TAFD25 |
| 14 | −4.19589 | 0.1040 | 1.49700 | 81.54 | 0.53748 | S-FPL51 |
| 15 | −1.49515 | 0.0069 | | | | |
| 16 | −24.78220 | 0.0579 | 1.71299 | 53.87 | 0.54587 | S-LAL8 |
| 17 | −4.06038 | 0.0967 | 1.84661 | 23.78 | 0.62072 | S-TIH53 |
| 18 | −1.78008 | 0.0794 | | | | |
| 19(Stop) | ∞ | 0.2305 | | | | |
| 20 | 2.99508 | 0.1082 | 1.80400 | 46.57 | 0.55724 | S-LAH65 |
| 21 | −7.65353 | 0.1700 | | | | |
| 22 | 5.54483 | 0.0414 | 1.62588 | 35.70 | 0.58935 | S-TIM1 |
| 23 | 1.07242 | 0.0670 | | | | |
| 24 | 2.88794 | 0.3350 | 1.49700 | 81.54 | 0.53748 | S-FPL51 |
| 25 | −0.63308 | 0.0622 | 1.84661 | 23.78 | 0.62072 | S-TIH53 |
| 26 | −1.49754 | 0.3705 | | | | |
| 27 | 24.94631 | 0.2107 | 1.71299 | 53.87 | 0.54587 | S-LAL8 |
| 28 | −1.46200 | 0.8781 | | | | |
| 29 | ∞ | 0.0794 | 1.51633 | 64.14 | 0.53531 | S-BSL7 |
| 30 | ∞ | 0.2622 | | | | |

TABLE 4

Example 2/Specs (d-line)

| | |
|---|---|
| Zoom Ratios | 1.0 |
| f | 1.00 |
| Bf | 1.19 |
| FNo. | 1.91 |
| 2ω[°] | 58.4 |

The Abbe numbers of the positive lenses L21 through L24 of the second lens group G2 are the same as those of Example 1. Accordingly, the advantageous effect obtained by these Abbe numbers is also the same as that of Example 1.

The Abbe number vd15 of the positive lens L25 which is the most-image-side lens of the second lens group G2 is 53.87. This value satisfies the suitable numerical conditions with respect to the most-image-side lens of the second lens group described above, i.e., the conditions that the Abbe number vd15 is greater than or equal to 40, more preferably greater than or equal to 45, and even more preferably greater than or equal to 50. In the case that the Abbe number of the most-image-side lens of the second lens group G2 is greater than or equal to 40, correction of lateral chromatic aberration will be facilitated. This advantageous effect will become more prominent in the case that the Abbe number is greater than or equal to 45, and even more prominent in the case that the Abbe number is greater than or equal to 50.

The refractive index Nd1 of the first lens L11 is the same as the value in Example 1. Therefore, the advantageous effect obtained by the value of the refractive index Nd1 is also the same as that of Example 1.

Figure 10:
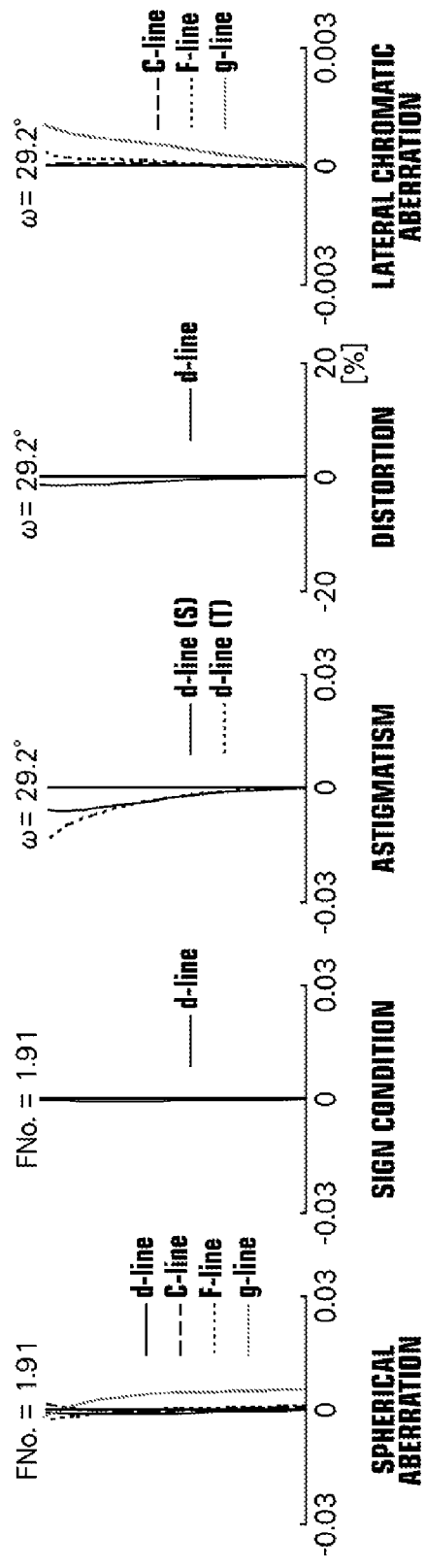
FIG. 10 illustrates aberration diagrams of the imaging lens of Example 2 described above.

FIG. 10 shows the respective aberration diagrams of the imaging lens of Example 2.

Example 3

A cross-sectional view illustrating the lens configuration of an imaging lens of Example 3 is shown in FIG. 4. Referring to FIG. 4, a schematic configuration of the imaging lens of Example 3 will be described. This imaging lens consists of a first lens group G1 having a positive refractive power and a second lens group G2 having a positive refractive power in this order from the object side along the optical axis Z. Focusing is performed by moving the entirety of the second lens group G2 along the optical axis Z.

An aperture stop St is disposed between the first lens group G1 and the second lens group G2.

The number of lenses which respectively constitute the first lens group G1 and the second lens group G2, the lens power arrangement, and the basic shape of each lens are the same as those in the imaging lens of Example 2. Accordingly, the advantageous effects obtained by the number of the lenses, the lens power arrangement, and the basic shape of each lens are the same as those in the imaging lens of Example 2.

Table 5 shows basic lens data of the imaging lens of Example 3. Further, Table 6 shows specs with respect to the d-line of the imaging lens of Example 3.

TABLE 5

Example 3/Lens Data

| Si Surface Numbers | Ri Radii of Curvature | Di Distances Between Surfaces | Ndj Refractive Indices | vdj Abbe Numbers | θg, Fj Partial Dispersion Ratios | Names of Materials |
|---|---|---|---|---|---|---|
| 1 | 3.35073 | 0.1767 | 1.83481 | 42.73 | 0.56486 | S-LAH55V |
| 2 | −50.48717 | 0.0069 | | | | |
| 3 | 1.57922 | 0.0759 | 1.49700 | 81.54 | 0.53748 | S-FPL51 |
| 4 | 0.70842 | 0.3264 | | | | |
| 5 | −2.36526 | 0.0517 | 1.84661 | 23.78 | 0.62072 | S-TIH53 |
| 6 | 1.19743 | 0.2611 | | | | |
| 7 | −2.83837 | 0.2854 | 1.90366 | 31.32 | 0.59481 | TAFD25 |
| 8 | −1.48586 | 0.1845 | | | | |
| 9 | 1.39654 | 0.2379 | 1.90366 | 31.32 | 0.59481 | TAFD25 |
| 10 | 16.98863 | 0.1540 | | | | |
| 11 | −6.25730 | 0.0517 | 1.54814 | 45.79 | 0.56859 | S-TIL1 |
| 12 | 1.98962 | 0.1222 | | | | |
| 13 | −1.29220 | 0.0666 | 1.90366 | 31.32 | 0.59481 | TAFD25 |
| 14 | −3.82381 | 0.1108 | 1.49700 | 81.54 | 0.53748 | S-FPL51 |
| 15 | −1.47044 | 0.0116 | | | | |
| 16 | −24.38820 | 0.0559 | 1.71299 | 53.87 | 0.54587 | S-LAL8 |
| 17 | −3.70142 | 0.0965 | 1.84661 | 23.78 | 0.62072 | S-TIH53 |
| 18 | −1.68493 | 0.0793 | | | | |
| 19(Stop) | ∞ | 0.2448 | | | | |
| 20 | 2.61375 | 0.0992 | 1.80400 | 46.58 | 0.55730 | S-LAH65V |
| 21 | −10.39642 | 0.2038 | | | | |
| 22 | 16.96094 | 0.0414 | 1.62588 | 35.70 | 0.58935 | S-TIM1 |
| 23 | 1.07771 | 0.0673 | | | | |
| 24 | 2.93463 | 0.3345 | 1.49700 | 81.54 | 0.53748 | S-FPL51 |
| 25 | −0.64905 | 0.0621 | 1.84661 | 23.78 | 0.62072 | S-TIH53 |
| 26 | −1.49397 | 0.3303 | | | | |
| 27 | 8.18307 | 0.2165 | 1.71299 | 53.87 | 0.54587 | S-LAL8 |
| 28 | −1.58976 | 0.8620 | | | | |
| 29 | ∞ | 0.0793 | 1.51633 | 64.14 | 0.53537 | S-BSL7 |
| 30 | ∞ | 0.2760 | | | | |

TABLE 6

Example 3/Specs (d-line)

| | |
|---|---|
| Zoom Ratios | 1.0 |
| f' | 1.00 |
| Bf' | 1.19 |
| FNo. | 1.90 |
| 2ω[°] | 58.4 |

Referring to Table 5 below, the Abbe number, the partial dispersion ratio, and the refractive index of each of the lenses which constitute the imaging lens of Example 3 will be described.

In the present Example, the Abbe number, the partial dispertion ratio, and the refractive index of each of the lenses which constitute the first lens group G1 and the second lens group G2 are the same as those in Example 2 except that the Abbe number vd11 and the partial dispersion ratio θg,F11 of a positive lens L21 in the second lens group G2 are respectively 46.58 and 0.55730. The value of the Abbe number vd11 described above satisfies the suitable numerical conditions with respect to the most-object-side lens of the second lens group described above. Therefore, the advantageous effect obtained by the value of the Abbe number vd11 is also the same as that of Example 1.

Figure 11:
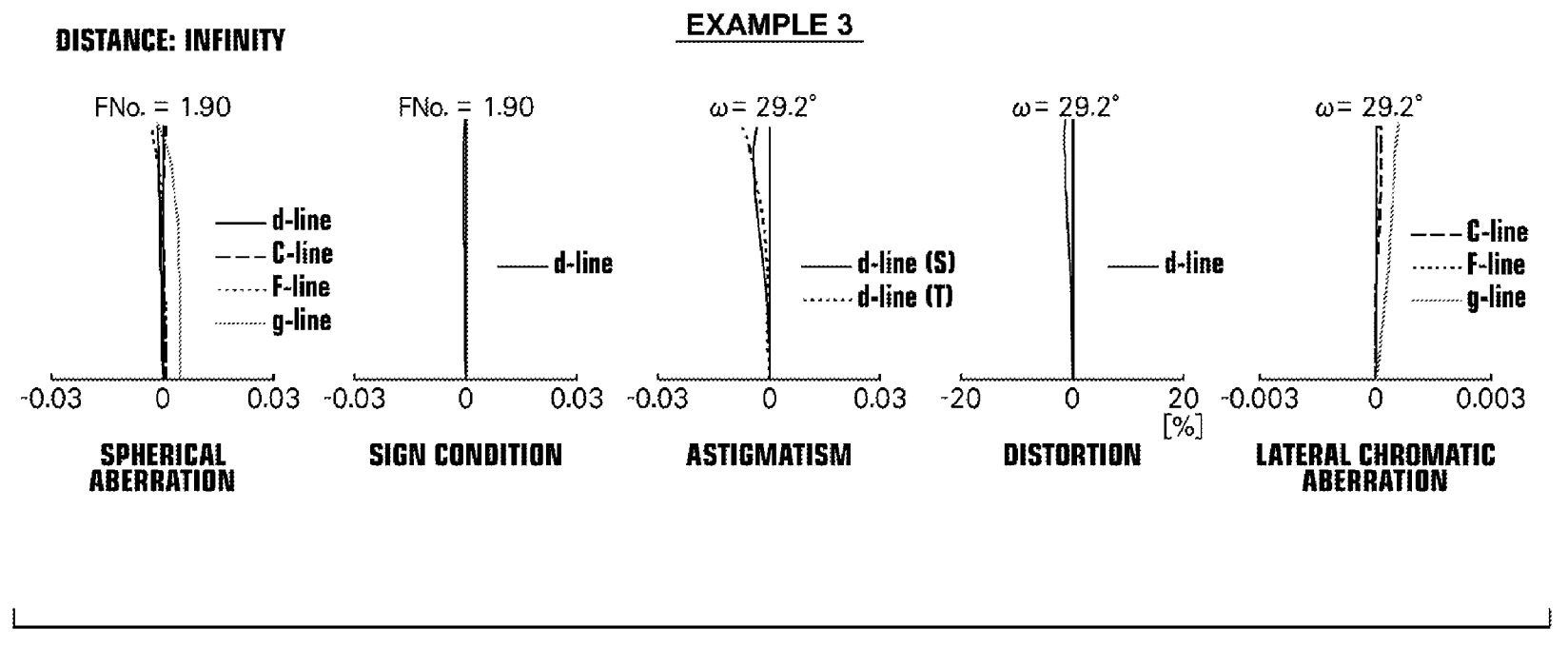

FIG. 11 shows the respective aberration diagrams of the imaging lens of Example 3.

Example 4

A cross-sectional view illustrating the lens configuration of an imaging lens of Example 4 is shown in FIG. 5. Referring to FIG. 5, a schematic configuration of the imaging lens of Example 4 will be described. This imaging lens consists of a first lens group G1 having a positive refractive power and a second lens group G2 having a positive refractive power in this order from the object side along the optical axis Z. Focusing is performed by moving the entirety of the second lens group G2 along the optical axis Z.

An aperture stop St is disposed between the first lens group G1 and the second lens group G2.

The number of lenses which respectively constitute the first lens group G1 and the second lens group G2 and the lens power arrangement are the same as those in the imaging lens of Example 1. Accordingly, the advantageous effects obtained by the number of the lenses and the lens power arrangement are the same as those in the imaging lens of Example 1.

A basic shape of each of the lenses which constitute the first lens group G1 and the second lens group G2 is the same of that of Example 1. However, the fifth lens L15 of the first lens group G1 and a positive lens L26 of the second lens group G2 are meniscus lenses (both are planoconvex lenses in Example 1). Therefore, the advantageous effect obtained by the basic shape of each lens is also the same as that of Example 1 except for what is specified below.

A fifth lens L15 is a lens with a convex surface toward the object side. This facilitates correction of spherical aberration and astigmatism in the same manner as Example 1 in which the fifth lens L15 is a planoconvex lens with a convex surface toward the object side.

Each of a positive lens L26 which is the most-image-side lens of the second lens group G2 and a positive lens L25 which is second from the most-image side in the second lens group G2 is a lens with a convex surface toward the image side. This will facilitate suppression of the angles at which the peripheral rays enter the image sensor in the present Example as well, in the same manner as in Example 1 in which a planoconvex lens is employed as the positive lens L26.

Table 7 shows basic lens data of the imaging lens of Example 4. Further, Table 8 shows specs with respect to the d-line of the imaging lens of Example 4.

TABLE 7

Example 4/Lens Data

| Si Surface Numbers | Ri Radii of Curvature | Di Distances Between Surfaces | Ndj Refractive Indices | vdj Abbe Numbers | θg, Fj Partial Dispersion Ratios | Names of Materials |
|---|---|---|---|---|---|---|
| 1 | 3.30522 | 0.1533 | 1.83481 | 42.73 | 0.56486 | S-LAH55V |
| 2 | −67.62341 | 0.0069 | | | | |
| 3 | 1.57915 | 0.0759 | 1.49700 | 81.54 | 0.53748 | S-FPL51 |
| 4 | 0.69094 | 0.3310 | | | | |
| 5 | −2.21624 | 0.0517 | 1.84661 | 23.78 | 0.62072 | S-TIH53 |
| 6 | 1.22421 | 0.3348 | | | | |
| 7 | −2.59974 | 0.2276 | 1.90366 | 31.32 | 0.59481 | TAFD25 |
| 8 | −1.49813 | 0.1470 | | | | |
| 9 | 1.45145 | 0.1896 | 1.90366 | 31.32 | 0.59481 | TAFD25 |
| 10 | −82.65258 | 0.2004 | | | | |
| 11 | −11.90692 | 0.0517 | 1.57501 | 41.50 | 0.57672 | S-TIL27 |
| 12 | 1.88873 | 0.1348 | | | | |
| 13 | −1.28411 | 0.0517 | 1.84666 | 23.78 | 0.62054 | S-TIH53 |
| 14 | −3.59597 | 0.1039 | 1.49700 | 81.54 | 0.53748 | S-FPL51 |
| 15 | −1.68311 | 0.0069 | | | | |
| 16 | −11.24043 | 0.1000 | 1.84661 | 23.78 | 0.62072 | S-TIH53 |
| 17 | −1.70877 | 0.0793 | | | | |
| 18(Stop) | ∞ | 0.2299 | | | | |
| 19 | 3.05158 | 0.0888 | 1.80400 | 46.57 | 0.55724 | S-LAH65 |
| 20 | −14.43568 | 0.2338 | | | | |
| 21 | 10.92975 | 0.0414 | 1.62588 | 35.70 | 0.58935 | S-TIM1 |
| 22 | 1.16199 | 0.0493 | | | | |
| 23 | 3.37669 | 0.3276 | 1.49700 | 81.54 | 0.53748 | S-FPL51 |
| 24 | −0.65083 | 0.0864 | 1.84661 | 23.78 | 0.62072 | S-TIH53 |
| 25 | −1.41048 | 0.0069 | | | | |
| 26 | −11.91561 | 0.0833 | 1.66672 | 48.32 | 0.56101 | S-BAH11 |
| 27 | −3.29631 | 0.3673 | | | | |
| 28 | 145.83132 | 0.1584 | 1.5893 | 61.14 | 0.54067 | S-BAL35 |
| 29 | −1.51938 | 0.8768 | | | | |
| 30 | ∞ | 0.0793 | 1.5163 | 64.14 | 0.53531 | S-BSL7 |
| 31 | ∞ | 0.2759 | | | | |

TABLE 8

| Example 4/Specs (d-line) | |
| --- | --- |
| Zoom Ratios | 1.0 |
| f | 1.00 |
| Bf | 1.20 |
| FNo. | 1.90 |
| 2ω[°] | 58.4 |

Referring to Table 7 below, the Abbe number, the partial dispersion ratio, and the refractive index of each of the lenses which constitute the imaging lens of Example 4 will be described.

In the present Example, the Abbe number, the partial dispertion ratio, and the refractive index of each of the lenses which constitute the first lens group G1 and the second lens group G2 are the same as those in Example 1 except that the Abbe number vd14, the partial dispersion ratio θg,F14, and the refractive index Nd14 of a positive lens L25 in the second lens group G2 are respectively 48.32, 0.56101, and 1.66672. The value of the Abbe number vd14 described above satisfies the suitable numerical conditions (with respect to the lens which is second from the most-image side in the second lens group). Therefore, the advantageous effect obtained by the value of the Abbe number vd14 is also the same as that of Example 1.

Figure 12:
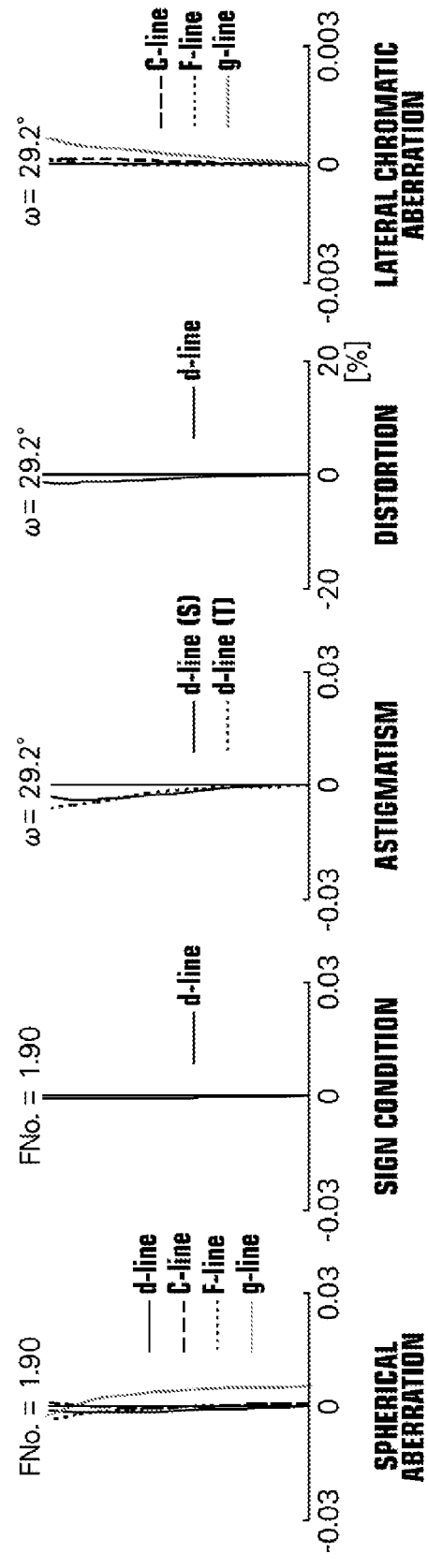
FIG. 12 illustrates aberration diagrams of the imaging lens of Example 4 described above.

FIG. 12 shows the respective aberration diagrams of the imaging lens of Example 4.

Example 5

A cross-sectional view illustrating the lens configuration of an imaging lens of Example 5 is shown in FIG. 6. Referring to FIG. 6, a schematic configuration of the imaging lens of Example 5 will be described. This imaging lens consists of a first lens group G1 having a positive refractive power and a second lens group G2 having a positive refractive power in this order from the object side along the optical axis Z. Focusing is performed by moving the entirety of the second lens group G2 along the optical axis Z.

An aperture stop St is disposed between the first lens group G1 and the second lens group G2.

The number of lenses which respectively constitute the first lens group G1 and the second lens group G2 and the lens power arrangement are the same as those in the imaging lens of Example 1. Accordingly, the advantageous effects obtained by the number of the lenses and the lens power arrangement are the same as those in the imaging lens of Example 1.

A basic shape of each of the lenses which constitute the first lens group G1 and the second lens group G2 is the same of that of Example 1. However, the fifth lens L15 of the first lens group G1 and a positive lens L26 of the second lens group G2 are meniscus lenses (both are planoconvex lenses in Example 1). Therefore, the advantageous effect obtained by the basic shape of each lens is also the same as that of Example 1 except for what is specified below.

A fifth lens L15 is a lens with a convex surface toward the object side. This facilitates correction of spherical aberration and astigmatism in the same manner as Example 1 in which the fifth lens L15 is a planoconvex lens with a convex surface toward the object side.

Configuring the fifth lens L15 to be a positive meniscus lens with a convex surface toward the object side facilitates correction of spherical aberration and astigmatism.

Each of a positive lens L26 which is the most-image-side lens of the second lens group G2 and a positive lens L25 which is second from the most-image side in the second lens group G2 is a lens with a convex surface toward the image side. This will facilitate suppression of the angles at which the peripheral rays enter the image sensor in the present Example as well, in the same manner as in Example 1 in which a planoconvex lens is employed as the positive lens L26.

Table 9 shows basic lens data of the imaging lens of Example 5. Further, Table 10 shows specs with respect to the d-line of the imaging lens of Example 5.

TABLE 9

| Example 5/Lens Data | | | | | | |
| --- | --- | --- | --- | --- | --- | --- |
| Si Surface Numbers | Ri Radii of Curvature | Di Distances Between Surfaces | Ndj Refractive Indices | vdj Abbe Numbers | θg, Fj Partial Dispersion Ratios | Names of Materials |
| 1 | 3.33402 | 0.1711 | 1.83481 | 42.73 | 0.56486 | S-LAH55V |
| 2 | −48.93901 | 0.0069 | | | | |
| 3 | 1.55268 | 0.0759 | 1.49700 | 81.54 | 0.53748 | S-FPL51 |
| 4 | 0.68495 | 0.3327 | | | | |
| 5 | −2.12081 | 0.0517 | 1.84661 | 23.78 | 0.62072 | S-TIH53 |
| 6 | 1.21855 | 0.3347 | | | | |
| 7 | −2.70673 | 0.2152 | 1.90366 | 31.32 | 0.59481 | TAFD25 |
| 8 | −1.47883 | 0.1355 | | | | |
| 9 | 1.40344 | 0.1655 | 1.90366 | 31.32 | 0.59481 | TAFD25 |
| 10 | 92.44075 | 0.2028 | | | | |
| 11 | −10.94866 | 0.0517 | 1.57501 | 41.50 | 0.57672 | S-TIL27 |
| 12 | 1.82655 | 0.1391 | | | | |
| 13 | −1.30215 | 0.0533 | 1.84661 | 23.78 | 0.62072 | S-TIH53 |
| 14 | −3.58510 | 0.1054 | 1.49700 | 81.54 | 0.53748 | S-FPL51 |
| 15 | −1.70774 | 0.0069 | | | | |
| 16 | −10.07788 | 0.1179 | 1.84661 | 23.78 | 0.62072 | S-TIH53 |
| 17 | −1.65891 | 0.0793 | | | | |
| 18(Stop) | ∞ | 0.2299 | | | | |
| 19 | 3.24109 | 0.0842 | 1.80400 | 46.57 | 0.55724 | S-LAH65 |
| 20 | −15.80457 | 0.2405 | | | | |
| 21 | 11.06169 | 0.0414 | 1.62588 | 35.70 | 0.58935 | S-TIM1 |
| 22 | 1.15339 | 0.0512 | | | | |

TABLE 9-continued

Example 5/Lens Data

| Si Surface Numbers | Ri Radii of Curvature | Di Distances Between Surfaces | Ndj Refractive Indices | vdj Abbe Numbers | θg, Fj Partial Dispersion Ratios | Names of Materials |
|---|---|---|---|---|---|---|
| 23 | 2.78348 | 0.3185 | 1.49700 | 81.54 | 0.53748 | S-FPL51 |
| 24 | −0.64664 | 0.0939 | 1.84661 | 23.78 | 0.62072 | S-TIH53 |
| 25 | −1.39621 | 0.0069 | | | | |
| 26 | −13.11757 | 0.0727 | 1.57099 | 50.80 | 0.55887 | S-BAL2 |
| 27 | −3.33589 | 0.3760 | | | | |
| 28 | −257.55638 | 0.1632 | 1.58913 | 61.14 | 0.54067 | S-BAL35 |
| 29 | −1.45735 | 0.8768 | | | | |
| 30 | ∞ | 0.0793 | 1.51633 | 64.14 | 0.53531 | S-BSL7 |
| 31 | ∞ | 0.2759 | | | | |

TABLE 10

Example 5/Specs (d-line)

| Zoom Ratios | 1.0 |
|---|---|
| f | 1.00 |
| Bf | 1.20 |
| FNo | 1.90 |
| 2ω[°] | 58.4 |

Referring to Table 9 below, the Abbe number, the partial dispersion ratio, and the refractive index of each of the lenses which constitute the imaging lens of Example 5 will be described.

In the present embodiment, the Abbe number, the partial dispertion ratio, and the refractive index of each of the lenses which constitute the first lens group G1 and the second lens group G2 are all the same as those in Example 1. Therefore, the advantageous effects obtained by the values of these Abbe numbers, the partial dispersion ratios, and the refractive indices are also the same as those of Example 1.

Figure 13:
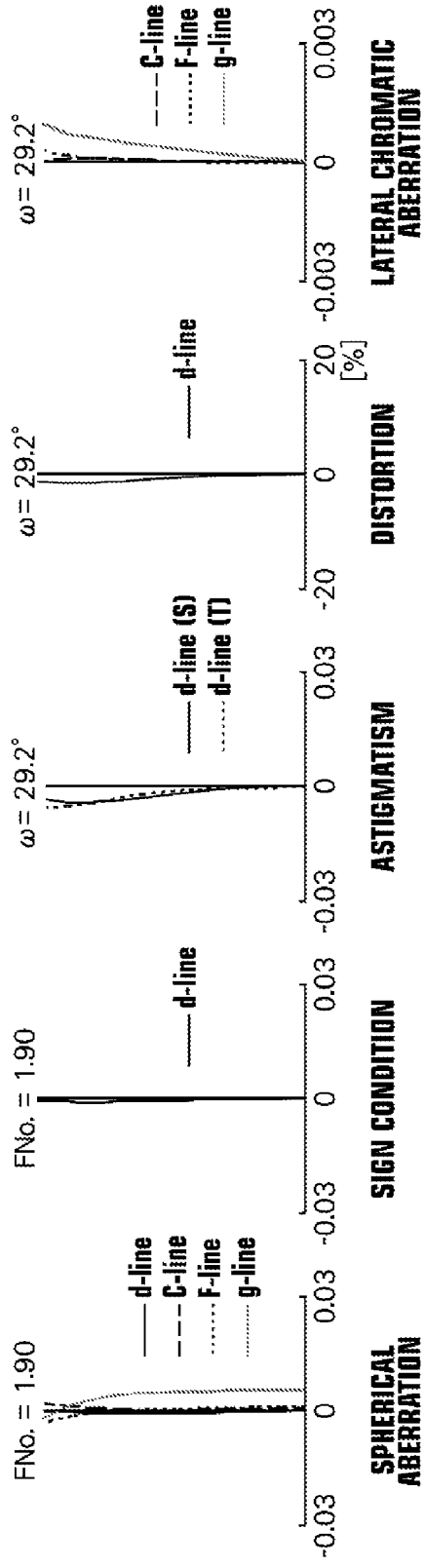
FIG. 13 illustrates aberration diagrams of the imaging lens of Example 5 described above.

FIG. 13 shows the respective aberration diagrams of the imaging lens of Example 5.

Example 6

Figure 7:
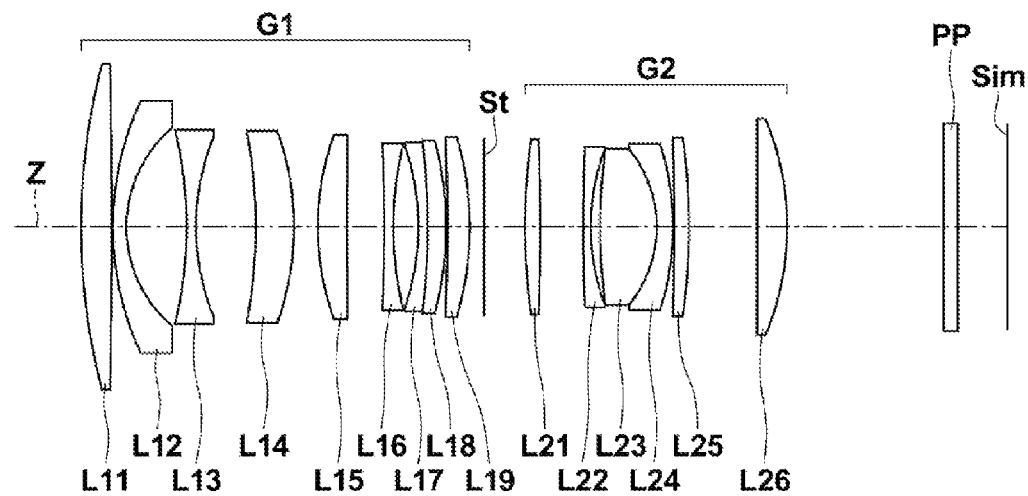
FIG. 7 is a cross-sectional view illustrating the lens configuration of an imaging lens according to Example 6 of the present invention.

A cross-sectional view illustrating the lens configuration of an imaging lens of Example 6 is shown in FIG. 7. Referring to FIG. 7, a schematic configuration of the imaging lens of Example 6 will be described. This imaging lens consists of a first lens group G1 having a positive refractive power and a second lens group G2 having a positive refractive power in this order from the object side along the optical axis Z. Focusing is performed by moving the entirety of the second lens group G2 along the optical axis Z.

An aperture stop St is disposed between the first lens group G1 and the second lens group G2.

The number of lenses which respectively constitute the first lens group G1 and the second lens group G2 and the lens power arrangement are the same as those in the imaging lens of Example 1. Accordingly, the advantageous effects obtained by the number of the lenses and the lens power arrangement are the same as those in the imaging lens of Example 1.

A basic shape of each of the lenses which constitute the first lens group G1 and the second lens group G2 is the same of that of Example 1. However, the fifth lens L15 of the first lens group G1 and a positive lens L26 of the second lens group G2 are meniscus lenses (both are planoconvex lenses in Example 1). Therefore, the advantageous effect obtained by the basic shape of each lens is also the same as that of Example 1 except for what is specified below.

A fifth lens L15 is a lens with a convex surface toward the object side. This facilitates correction of spherical aberration and astigmatism in the same manner as Example 1 in which the fifth lens L15 is a planoconvex lens with a convex surface toward the object side.

Configuring the fifth lens L15 to be a positive meniscus lens with a convex surface toward the object side facilitates correction of spherical aberration and astigmatism.

Each of a positive lens L26 which is the most-image-side lens of the second lens group G2 and a positive lens L25 which is second from the most-image side in the second lens group G2 is a lens with a convex surface toward the image side. This will facilitate suppression of the angles at which the peripheral rays enter the image sensor in the present Example as well, in the same manner as in Example 1 in which a planoconvex lens is employed as the positive lens L26.

Table 11 shows basic lens data of the imaging lens of Example 6. Further, Table 12 shows specs with respect to the d-line of the imaging lens of Example 6.

TABLE 11

Example 6/Lens Data

| Si Surface Numbers | Ri Radii of Curvature | Di Distances Between Surfaces | Ndj Refractive Indices | vdj Abbe Numbers | θg, Fj Partial Dispersion Ratios | Names of Materials |
|---|---|---|---|---|---|---|
| 1 | 3.33808 | 0.1712 | 1.83481 | 42.73 | 0.56486 | S-LAH55V |
| 2 | −54.08572 | 0.0069 | | | | |
| 3 | 1.56287 | 0.0759 | 1.49700 | 81.54 | 0.53748 | S-FPL51 |
| 4 | 0.68363 | 0.3373 | | | | |
| 5 | −2.11966 | 0.0517 | 1.84661 | 23.78 | 0.62072 | S-TIH53 |

TABLE 11-continued

Example 6/Lens Data

| Si Surface Numbers | Ri Radii of Curvature | Di Distances Between Surfaces | Ndj Refractive Indices | vdj Abbe Numbers | θg, Fj Partial Dispersion Ratios | Names of Materials |
|---|---|---|---|---|---|---|
| 6 | 1.22228 | 0.3344 | | | | |
| 7 | −2.69911 | 0.2148 | 1.90366 | 31.32 | 0.59481 | TAFD25 |
| 8 | −1.48146 | 0.1333 | | | | |
| 9 | 1.40156 | 0.1655 | 1.90366 | 31.32 | 0.59481 | TAFD25 |
| 10 | 105.03735 | 0.2054 | | | | |
| 11 | −10.87599 | 0.0517 | 1.57501 | 41.50 | 0.57672 | S-TIL27 |
| 12 | 1.82025 | 0.1402 | | | | |
| 13 | −1.30347 | 0.0523 | 1.84661 | 23.78 | 0.62072 | S-TIH53 |
| 14 | −3.59050 | 0.1042 | 1.49700 | 81.54 | 0.53748 | S-FPL51 |
| 15 | −1.71013 | 0.0069 | | | | |
| 16 | −9.91618 | 0.1245 | 1.84661 | 23.78 | 0.62072 | S-TIH53 |
| 17 | −1.65930 | 0.0793 | | | | |
| 18(Stop) | ∞ | 0.2299 | | | | |
| 19 | 3.22931 | 0.0850 | 1.80400 | 46.57 | 0.55724 | S-LAH65 |
| 20 | −14.73196 | 0.2424 | | | | |
| 21 | 10.86565 | 0.0414 | 1.62588 | 35.70 | 0.58935 | S-TIM1 |
| 22 | 1.15233 | 0.0517 | | | | |
| 23 | 2.80882 | 0.3173 | 1.49700 | 81.54 | 0.53748 | S-FPL51 |
| 24 | −0.64662 | 0.0920 | 1.84661 | 23.78 | 0.62072 | S-TIH53 |
| 25 | −1.40016 | 0.0069 | | | | |
| 26 | −12.94907 | 0.0819 | 1.57099 | 50.80 | 0.55887 | S-BAL2 |
| 27 | −3.32031 | 0.3830 | | | | |
| 28 | −220.07327 | 0.1672 | 1.58913 | 61.14 | 0.54067 | S-BAL35 |
| 29 | −1.45500 | 0.8768 | | | | |
| 30 | ∞ | 0.0793 | 1.51633 | 64.14 | 0.53531 | S-BSL7 |
| 31 | ∞ | 0.2760 | | | | |

TABLE 12

Example 6/Specs (d-line)

| Zoom Ratios | 1.0 |
|---|---|
| f | 1.00 |
| Bf | 1.21 |
| FNo. | 1.90 |
| 2ω[°] | 58.4 |

Referring to Table 11 below, the Abbe number, the partial dispersion ratio, and the refractive index of each of the lenses which constitute the imaging lens of Example 6 will be described.

In the present embodiment, the Abbe number, the partial dispertion ratio, and the refractive index of each of the lenses which constitute the first lens group G1 and the second lens group G2 are all the same as those in Example 1. Therefore, the advantageous effects obtained by the values of these Abbe numbers, the partial dispersion ratios, and the refractive indices are also the same as those of Example 1.

Figure 14:
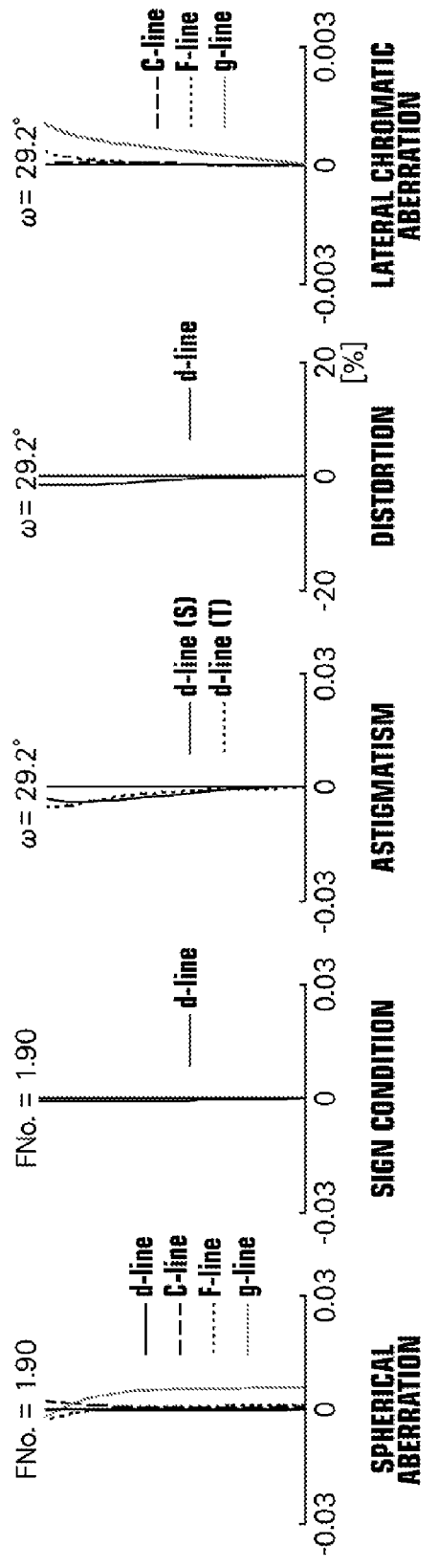
FIG. 14 illustrates aberration diagrams of the imaging lens of Example 6 described above.

FIG. 14 shows the respective aberration diagrams of the imaging lens of Example 6.

Example 7

Figure 8:
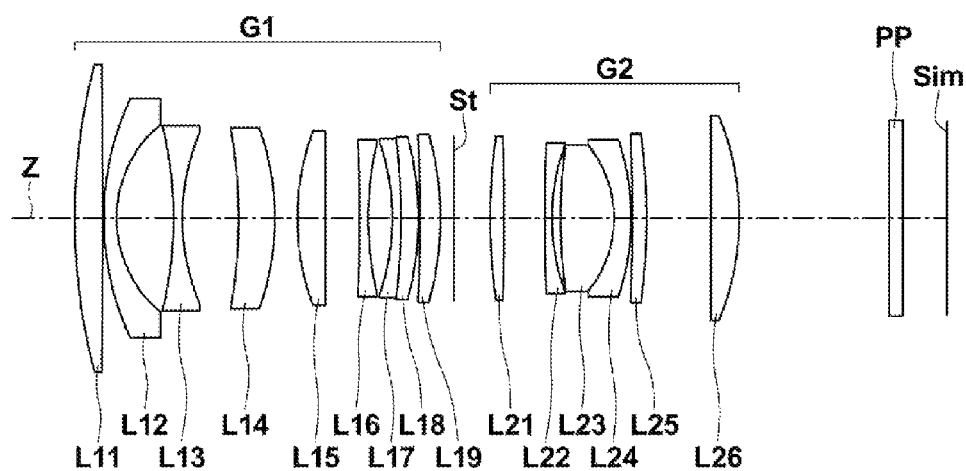
FIG. 8 is a cross-sectional view illustrating the lens configuration of an imaging lens of Example 7 of the present invention.

A cross-sectional view illustrating the lens configuration of an imaging lens of Example 7 is shown in FIG. 8. Referring to FIG. 8, a schematic configuration of the imaging lens of Example 7 will be described. This imaging lens consists of a first lens group G1 having a positive refractive power and a second lens group G2 having a positive refractive power in this order from the object side along the optical axis Z. Focusing is performed by moving the entirety of the second lens group G2 along the optical axis Z.

An aperture stop St is disposed between the first lens group G1 and the second lens group G2.

The number of lenses which respectively constitute the first lens group G1 and the second lens group G2 and the lens power arrangement are the same as those in the imaging lens of Example 1. Accordingly, the advantageous effects obtained by the number of the lenses and the lens power arrangement are the same as those in the imaging lens of Example 1.

A basic shape of each of the lenses which constitute the first lens group G1 and the second lens group G2 is the same of that of Example 1. However, the fifth lens L15 of the first lens group G1 is a positive meniscus lens (which is a planoconvex lens in Example 1). Therefore, the advantageous effect obtained by the basic shape of each lens is also the same as that of Example 1 except for what is specified below.

The fifth lens L15 is a lens with a convex surface toward the object side. This facilitates correcting spherical aberration and astigmatism in the same manner as the imaging lens of Example 1 in which the fifth lens L15 is a planoconvex lens with a convex surface toward the object side.

Further, configuring the fifth lens L15 to be a positive meniscus lens with a convex surface toward the object side facilitates correcting spherical aberration and astigmatism.

Table 13 shows basic lens data of the imaging lens of Example 7. Further, Table 14 shows specs with respect to the d-line of the imaging lens of Example 7.

TABLE 13

Example 7/Lens Data

| Si Surface Numbers | Ri Radii of Curvature | Di Distances Between Surfaces | Ndj Refractive Indices | vdj Abbe Numbers | θg, Fj Partial Dispersion Ratios | Names of Materials |
|---|---|---|---|---|---|---|
| 1 | 3.35715 | 0.1652 | 1.83481 | 42.73 | 0.56486 | S-LAH55V |
| 2 | −69.59278 | 0.0069 | | | | |
| 3 | 1.56690 | 0.0760 | 1.49700 | 81.54 | 0.53748 | S-FPL51 |
| 4 | 0.68277 | 0.3392 | | | | |
| 5 | −2.12015 | 0.0518 | 1.80518 | 25.42 | 0.61616 | S-TIH6 |
| 6 | 1.21477 | 0.3348 | | | | |
| 7 | −2.73300 | 0.2152 | 1.83481 | 42.73 | 0.56486 | S-LAH55V |
| 8 | −1.47603 | 0.1337 | | | | |
| 9 | 1.40467 | 0.1657 | 1.90366 | 31.32 | 0.59481 | TAFD25 |
| 10 | 112.23599 | 0.2036 | | | | |
| 11 | −10.80209 | 0.0518 | 1.57501 | 41.50 | 0.57672 | S-TIL27 |
| 12 | 1.82603 | 0.1427 | | | | |
| 13 | −1.30234 | 0.0518 | 1.84661 | 23.78 | 0.62072 | S-TIH53 |
| 14 | −3.59743 | 0.1039 | 1.49700 | 81.54 | 0.53748 | S-FPL51 |
| 15 | −1.71585 | 0.0084 | | | | |
| 16 | −9.92938 | 0.1225 | 1.84661 | 23.78 | 0.62072 | S-TIH53 |
| 17 | −1.66531 | 0.0794 | | | | |
| 18(Stop) | ∞ | 0.2157 | | | | |
| 19 | 3.22890 | 0.0833 | 1.80400 | 46.57 | 0.55724 | S-LAH65 |
| 20 | −14.83331 | 0.2418 | | | | |
| 21 | 10.80062 | 0.0414 | 1.62588 | 35.70 | 0.58935 | S-TIM1 |
| 22 | 1.15746 | 0.0513 | | | | |
| 23 | 2.80595 | 0.3177 | 1.49700 | 81.54 | 0.53748 | S-FPL51 |
| 24 | −0.64819 | 0.1015 | 1.84661 | 23.78 | 0.62072 | S-TIH53 |
| 25 | −1.39929 | 0.0069 | | | | |
| 26 | −12.93548 | 0.0860 | 1.57099 | 50.80 | 0.55887 | S-BAL2 |
| 27 | −3.31020 | 0.3824 | | | | |
| 28 | ∞ | 0.1674 | 1.58913 | 61.14 | 0.54067 | S-BAL35 |
| 29 | −1.46883 | 0.8926 | | | | |
| 30 | ∞ | 0.0794 | 1.51633 | 64.14 | 0.53531 | S-BSL7 |
| 31 | ∞ | 0.2612 | | | | |

TABLE 14

Example 7/Specs (d-line)

| | |
|---|---|
| Zoom Ratios | 1.0 |
| f | 1.00 |
| Bf | 1.21 |
| FNo. | 1.90 |
| 2ω[°] | 58.6 |

Referring to Table 13 below, the Abbe number, the partial dispersion ratio, and the refractive index of each of the lenses which constitute the imaging lens of Example 7 will be described.

In the present Example, the Abbe number, the partial dispertion ratio, and the refractive index of each of the lenses which constitute the first lens group G1 and the second lens group G2 are the same as those in Example 1 except that the Abbe number vd3, the partial dispersion ratio θg,F3, and the refractive index Nd3 of the third lens L13 are respectively 25.42, 0.61616, and 1.80518; and the Abbe number vd4, the partial dispersion ratio θg,F4, and the refractive index Nd4 of the fourth lens L14 are respectively 42.73, 0.56486, and 1.83481. The values of the Abbe number vd3 and the partial dispersion ratio θg,F3 of the third lens L13 satisfy the suitable numerical conditions with respect to the third lens described above, and the values of the Abbe number vd4 and the partial dispersion ratio θg,F4 of the fourth lens L14 also satisfy the suitable numerical conditions with respect to the fourth lens described above. Therefore, the advantageous effects obtained by the values of these Abbe numbers and the partial dispersion ratios are also the same as those of Example 1.

Figure 15:
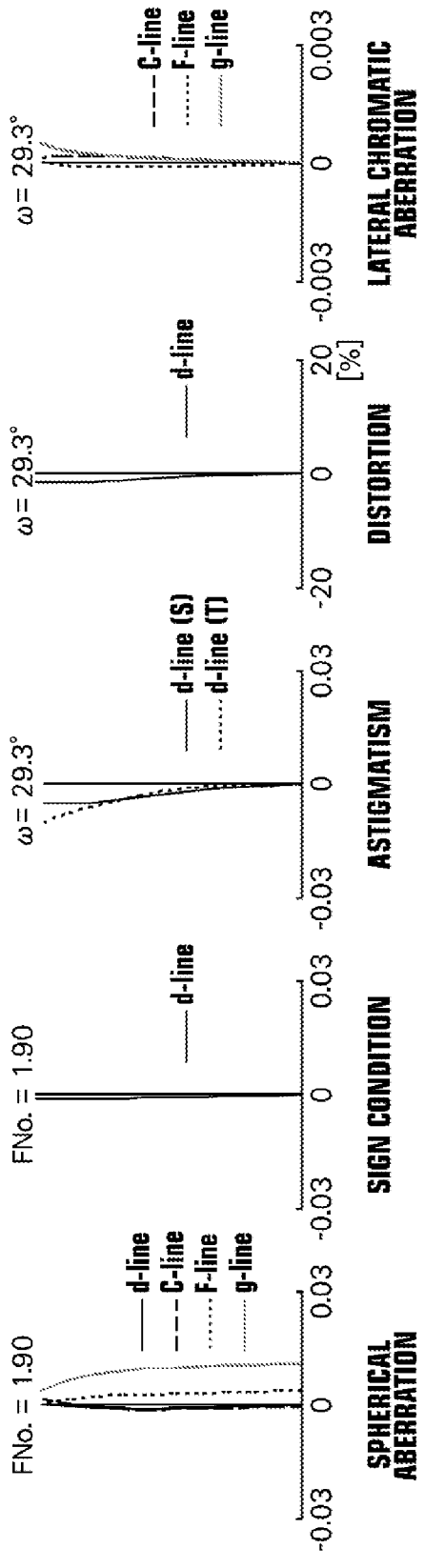
FIG. 15 illustrates aberration diagrams of the imaging lens of Example 7 described above.

FIG. 15 illustrates the respective aberration diagrams of the imaging lens of Example 7.

Table 15 shows the values of the conditions, of which the numerical ranges are defined by the conditional formulas (1) through (17) described above with respect to Examples 1 through 7. Note that a collection of the conditions, the numerical ranges of which are respectively defined by conditional formulas is shown below: conditional formula (1) defines vd2/vd3, conditional formula (2) defines FA/FB, conditional formula (3) defines f1/f, conditional formula (4) defines (RLF+RLB)/(RLF−RLB), conditional formula (5) defines (RL2F+RL2B)/(RL2F−RL2B), conditional formula (6) defines f1234/f, conditional formula (7) defines f123/f, conditional formula (8) defines FA/f, conditional formula (9) defines FB/f, conditional formula (10) defines (R7+R8)/(R7−R8), conditional formula (11) defines D6/f, conditional formula (12) defines D4/f, conditional formula (13) defines f1/f2, conditional formula (14) defines L/f, conditional formula (15) defines Bf/f, conditional formula (16) defines (R1+R2)/(R1−R2), and conditional formula (17) defines (R9+R10)/(R9−R10).

TABLE 15

| Expression Numbers | Conditional Formulas | Example 1 | Example 2 | Example 3 | Example 4 | Example 5 | Example 6 | Example 7 |
|---|---|---|---|---|---|---|---|---|
| (1) | vd2/vd3 | 3.43 | 3.43 | 3.43 | 3.43 | 3.43 | 3.43 | 3.21 |
| (2) | FA/FB | 4.46 | 3.14 | 2.60 | 3.33 | 3.23 | 3.34 | 3.51 |
| (3) | f1/f | 3.63 | 3.77 | 3.77 | 3.78 | 3.74 | 3.77 | 3.84 |
| (4) | (RLF + RLB)/(RLF − RLB) | 1.00 | 0.89 | 0.67 | 0.98 | 1.01 | 1.01 | 1.00 |
| (5) | (RL2F + RL2B)/(RL2F − RL2B) | 1.67 | −2.46 | −2.54 | 1.76 | 1.68 | 1.69 | 1.69 |
| (6) | f1234/f | −1.42 | −1.55 | −1.60 | −1.43 | −1.45 | −1.43 | −1.45 |
| (7) | f123/f | −0.85 | −0.88 | −0.88 | −0.85 | −0.84 | −0.84 | −0.86 |
| (8) | FA/f | 7.69 | 5.65 | 4.78 | 6.12 | 5.90 | 6.11 | 6.38 |
| (9) | FB/f | 1.73 | 1.80 | 1.84 | 1.84 | 1.83 | 1.83 | 1.82 |
| (10) | (R7 + R8)/(R7 − R8) | 3.78 | 3.49 | 3.20 | 3.72 | 3.41 | 3.43 | 3.35 |
| (11) | D6/f | 0.38 | 0.32 | 0.26 | 0.33 | 0.33 | 0.33 | 0.33 |
| (12) | D4/f | 0.34 | 0.32 | 0.33 | 0.33 | 0.33 | 0.34 | 0.34 |
| (13) | f1/f2 | −0.35 | −0.30 | −0.34 | −0.41 | −0.40 | −0.42 | −0.46 |
| (14) | L/f | 5.16 | 5.13 | 5.15 | 5.12 | 5.13 | 5.16 | 5.15 |
| (15) | BF/f | 1.21 | 1.19 | 1.19 | 1.20 | 1.20 | 1.21 | 1.21 |
| (16) | (R1 + R2)/(R1 − R2) | −0.95 | −0.87 | −0.88 | −0.91 | −0.87 | −0.88 | −0.91 |
| (17) | (R9 + R10)/(R9 − R10) | −1.00 | −1.15 | −1.18 | −0.97 | −1.03 | −1.03 | −1.03 |

Figure 16:
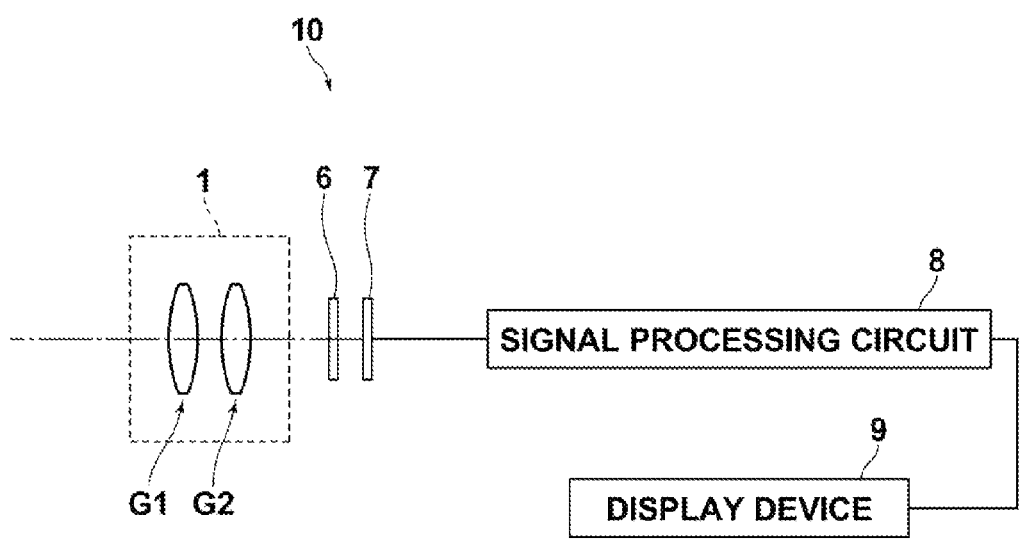
FIG. 16 is a schematic configuration of an imaging apparatus according to one embodiment of the present invention.

Next, an imaging apparatus according to an embodiment of the present invention will be described. FIG. 16 shows a schematic configuration of the imaging apparatus including the imaging lens of the embodiment of the present invention as an example of the imaging apparatus of the embodiment of the present invention. Note that FIG. 16 schematically illustrates each of the lens groups. Examples of this imaging apparatus include a video camera or an electronic still camera, and the like, in which a solid state image sensor such as a CCD, a CMOS, and the like is applied as a recording medium.

The imaging apparatus 10 shown in FIG. 16 includes an imaging lens 1; a filter 6, which is disposed on the image side of the imaging lens 1 and which has a function of a low-pass filter or the like; an image sensor 7 disposed on the image side of the filter 6; and a signal processing circuit 8. The image sensor 7 converts an optical image formed by the imaging lens 1 into an electric signal. A CCD (Charge Coupled Device), a CMOS (Complementary Metal Oxide Semiconductor), or the like may be employed as the image sensor 7, for example. The image sensor 7 is disposed such that the imaging surface thereof matches the imaging plane of the imaging lens 1. An image photographed by the imaging lens 1 is formed on the imaging surface of the image sensor 7, and an output signal regarding the image from the image sensor is subjected to an arithmetic processing by the signal processing circuit 8 so that an image is displayed on the display device 9.

The present invention has been described with reference to the Embodiments and Examples. The present invention is not limited to the embodiments and the examples described above, and various modifications are possible. For example, values, such as the radius of curvature, the distances between surfaces, the refractive indices, the Abbe numbers, and the partial dispersion ratios of each lens can be changed as appropriate.

The imaging apparatus of the present invention is not also limited to the configuration described above, and various modifications are possible.

What is claimed is:

1. An imaging lens substantially consisting of a first lens group having a positive refractive power and a second lens group having a positive refractive power in this order from the object side, wherein focusing is performed by moving the entirety of the second lens group along the optical axis;

the first lens group comprises a first lens having a positive refractive power which is disposed on the most-object side, a second lens having a negative refractive power which is disposed next to the first lens on the image side, a third lens having a negative refractive power which is disposed next to the second lens on the image side, a fourth lens having a positive refractive power which is disposed next to the third lens on the image side, and a fifth lens having a positive refractive power which is disposed next to the fourth lens on the image side; and the imaging lens satisfies conditional formula (1):

$$2.0 < vd2/vd3 \qquad (1),$$

where vd2: the Abbe number of the second lens with respect to the d-line, and vd3: the Abbe number of the third lens with respect to the d-line.

2. The imaging lens of claim 1, wherein an aperture stop is disposed between the first lens group and the second lens group.

3. The imaging lens of claim 1, wherein the first lens group comprises the first lens having a positive refractive power which is disposed on the most-object side, the second lens having a negative refractive power which is disposed next to the first lens on the image side, the third lens having a negative refractive power which is disposed next to the second lens on the image side, the fourth lens having a positive refractive power which is disposed next to the third lens on the image side, the fifth lens having a positive refractive power which is disposed next to the fourth lens on the image side, a sixth lens having a negative refractive power which is disposed next to the fifth lens on the image side, a seventh lens having a negative refractive power which is disposed next to the sixth lens on the image side, an eighth lens having a positive refractive power which is disposed next to the seventh lens on the image side, and a ninth lens having a positive refractive power which is disposed next to the eighth lens on the image side.

4. The imaging lens of claim 1 that satisfies conditional formula (2) below:

$$1.0 < FA/FB < 8.0 \qquad (2),$$

where

FA: the focal length of the first lens group, and

FB: the focal length of the second lens group.

5. The imaging lens of claim 1, wherein the first lens group comprises the first lens which is disposed on the most-object side; and the imaging lens satisfies conditional formula (3) below:

$$1 < f1/f < 6 \qquad (3),$$

where f1: the focal length of the first lens, and
f: the focal length of the entire system.

6. The imaging lens of claim 1, wherein the most-image-side lens of the second lens group has a positive refractive power; and the imaging lens satisfies conditional formula (4) below:

$$0.5 < (RLF+RLB)/(RLF-RLB) < 3.0 \qquad (4),$$

where

RLF: the radius of curvature of the object-side surface of the most-image-side lens of the second lens group, and
RLB: the radius of curvature of the image-side surface of the most-image-side lens of the second lens group.

7. The imaging lens of claim 1, wherein a lens which is second from the most-image side in the second lens group has a positive refractive power; and the imaging lens satisfies conditional formula (5) below:

$$0.3 < (RL2F+RL2B)/(RL2F-RL2B) < 3.0 \qquad (5),$$

where

RL2F: the radius of curvature of the object-side surface of the lens which is second from the most-image side in the second lens group, and
RL2B: the radius of curvature of the image-side surface of the lens which is second from the most-image side in the second lens group.

8. The imaging lens of claim 1, wherein both the most-image-side lens of the second lens group and the lens which is second from the most-image side in the second lens group are lenses with convex surfaces toward the image side.

9. The imaging lens of claim 1, wherein the most-image-side lens in the first lens group is a positive meniscus lens with a convex surface toward the image side.

10. An imaging apparatus comprising:
the imaging lens of claim 1.

* * * * *